United States Patent [19]
Takatori et al.

[11] Patent Number: 5,971,312
[45] Date of Patent: Oct. 26, 1999

[54] PHOTO FILM CASSETTE AND CASSETTE CONTAINING CASE FOR THE SAME

[75] Inventors: Tetsuya Takatori; Norio Ohkawa, both of Kanagawa, Japan

[73] Assignee: Fuji Photo Film Co., Ltd., Kanagawa, Japan

[21] Appl. No.: 08/949,907

[22] Filed: Oct. 14, 1997

[30] Foreign Application Priority Data

Oct. 15, 1996 [JP] Japan .................................. 8-272483

[51] Int. Cl.$^6$ ............................ G03B 23/02; B65D 85/66
[52] U.S. Cl. ..................................... 242/348.4; 242/338.1; 242/588.5; 242/588.6; 396/512; 396/514; 206/397
[58] Field of Search ................................. 242/348.4, 348, 242/588.5, 338.1, 338.2, 588.6; 396/512, 514; 206/397, 407, 408

[56] References Cited

U.S. PATENT DOCUMENTS

| | | | |
|---|---|---|---|
| 5,476,232 | 12/1995 | Kataoka et al. | 242/348.4 |
| 5,647,552 | 7/1997 | Takatori | 242/348.4 |

*Primary Examiner*—John Q. Nguyen
*Attorney, Agent, or Firm*—Sughrue, Mion, Zinn, Macpeak & Seas, PLLC

[57] ABSTRACT

A photo film cassette has a spool about which photo film is wound in a roll form. A cassette shell contains the spool in a rotatable manner, and has first and second plastic shell halves joined together via a joining line. A first extended portion is disposed on the first shell half, to project from the joining line toward the second shell half. A first claw is disposed on an end of the first extended portion, to project inwards, and has a first engaging face confronted with the joining line. A securing cutout is formed in the second shell half and disposed close to the joining line, for receiving the first extended portion. A second extended portion is disposed on the second shell half, to project from an edge of the securing cutout, and is extended inwards, and covered by the first extended portion partially. A second claw is disposed on an end of the second extended portion, to project outwards, and retains the first claw to secure the first shell half to the second shell half. The second claw has a second engaging face, which is confronted with the edge of the securing cutout, is fitted on the first engaging face, and keeps the second claw engaged with the first claw. Two ridges project from the second engaging face, are extended in a direction of access of the first claw, and are pushed by the first engaging face. The ridges are deformed partially by the first engaging face, to tighten a contact between the first and second claws.

18 Claims, 23 Drawing Sheets

PHOTO FILM CASSETTE AND CASSETTE CONTAINING CASE FOR THE SAME

BACKGROUND OF THE INVENTION

1. Field of the Invention

The present invention relates to a photo film cassette and a cassette containing case for the same. More particularly, the present invention relates to a photo film cassette of which a cassette shell consists of a pair of shell halves secured to one another via engagement of claws, a cassette containing case for the same.

2. Description Related to the Prior Art

There is an IX240 type of photo film cassette, in which a photo film including its leader is pre-contained in a cassette shell, and the leader of the photo film is advanced to the outside when a spool is rotated. U.S. Pat. No. 5,476,232 (corresponding to JP-A 6-266053) discloses a construction of the cassette shell in combination of a pair of shell halves of resin. There is a first arm formed on one of the shell halves and protruded inwards for retention. A second arm is formed on the other of the shell halves and protruded outwards for receiving the retention. The first arm is engaged with the second arm in a snap connection to join the shell halves fixedly. There are two retainer mechanisms each of which includes the first and second arms, and which are located in respective lateral positions beside a photo film passageway through which the photo film is passed. The first and second arms have such a sufficient width in a direction of an exit slot of the passageway that lateral ends of the passageway is enclosed in a reliably light-tight manner.

There is a problem in the simple snap connection as described in the prior art portion of U.S. Pat. No. 5,647,552 (corresponding to JP-A 8-146561). The photo film cassette was subjected to a test of dropping down to an iron plate from a height of 2 (two) meters. A considerable number of sample cassettes resulted in disengagement of the snap connection. U.S. Pat. No. 5,647,552 suggests an idea of reinforcing the snap connection. The second arm is constituted by a second claw protruded outwards and an engaging face or recessed face. The second claw prevents the first arm from being disengaged. The engaging face receives a first claw protruded inwards from the first arm. The first arm is formed in such a size that, when the first arm is fitted at the engaging face, the first claw and the engaging face are pressed against each other. To form the first arm, the same document discloses relevant values, including: a height of the first claw of the first arm, a shifting amount at which the first arm is shifted for passing by the second claw, and a sectional area of an erected support supporting the first claw of the first arm for the purpose of maintaining the shifted amount thus determined.

However there occurs a problem of play between the first and second arms or failure in the retention between them, because a height of the second arm is not determined suitably. If heights of the first and second arms are determined, dimensional tolerances are provided for the heights. The shell halves are molded by respective separate molds. When shell halves are combined randomly, deviations in the ranges of the dimensional tolerances becomes dimensional errors. Of course it is conceivable to reduce such dimensional errors. Then another problem arises in narrowing ranges of the dimensional tolerances, and increasing costs of production by use of molds.

SUMMARY OF THE INVENTION

In view of the foregoing problems, an object of the present invention is to provide a photo film cassette of which arms or claws can be engaged together in a reliable manner of snap connection without being influenced by dimensional errors.

Another object of the present invention is to provide a cassette containing case for containing the photo film cassette in a manner capable of preventing a spool from being rotated with shock or vibration.

In order to achieve the above and other objects and advantages of this invention, a photo film cassette includes a spool about which photo film is wound in a roll form, and a cassette shell for containing the spool in a rotatable manner, the cassette shell being constituted by first and second shell halves formed respectively from plastic, and joined together via a joining line. The photo film cassette has a first extended portion, disposed on the first shell half, to project from the joining line toward the second shell half. A first claw is disposed on an end of the first extended portion, to project inwards with reference to the cassette shell, the first claw having a first engaging face oriented to confront with the joining line. A securing cutout is formed in the second shell half and disposed close to the joining line, for receiving the first extended portion. A second extended portion is disposed on the second shell half, to project from an edge of the securing cutout, the second extended portion being extended inwards with reference to the cassette shell, and covered by the first extended portion at least partially. A second claw is disposed on an end of the second extended portion, to project outwards with reference to the cassette shell, for retaining the first claw to secure the first shell half to the second shell half, the second claw having a second engaging face oriented to confront with the edge of the securing cutout, fitted on the first engaging face, for keeping the second claw engaged with the first claw. At least one ridge is disposed to project from the second engaging face, extended in a direction of access of the first claw, and pushed by the first engaging face, the first claw and the ridge satisfying a condition of:

$$h1 > H$$

where $h1$ is a height of the ridge with reference to the joining line, and $H$ is a height of the first engaging face with reference to the joining line, whereby the ridge is deformed at least partially by the first engaging face, to tighten a contact between the first and second claws.

The photo film cassette further includes a photo film passageway, formed between the first and second shell half to open the cassette shell along a part of the joining line, the photo film being advanced through the passageway to exit from the cassette shell. First and second retainer mechanisms are disposed on respective sides of the passageway, each of the first and second retainer mechanisms being constituted by the first and second extended portions, the first and second claws and the securing cutout.

The first and second claws satisfy a condition of:

$$H \geq h2$$

where $h2$ is a height of the second engaging face with reference to the joining line.

There is a gap defined between an outer face of the first extended portion and the edge of the securing cutout by receiving the first extended portion in the securing cutout. The securing cutout and the gap satisfy a condition of:

$$[16-(W_1^2/4)]^{1/2} > 4-d$$

where d in millimeters is a depth of the gap with reference to the edge of the securing cutout, and $W_1$ in millimeters is a range of the securing cutout as viewed vertically to the access direction of the first claw.

In a preferred embodiment, a cassette containing case contains a photo film cassette, the photo film cassette including a spool about which photo film is wound in a roll form, a cassette shell for containing the spool in a rotatable manner, and a pair of key ways, formed respectively in the axial ends, exposed respectively in the end faces of the cassette shell, and adapted to rotation of the spool in response to external operation. The cassette containing case includes a peripheral wall for covering a peripheral face of the cassette shell. First and second end walls respectively cover the end faces of the cassette shell. At least one lock projection is disposed to project from an inside of the first end wall, received in one of the key ways when the indicator plate is in the unexposed status position, for preventing the spool from rotating.

The photo film cassette includes plural indicator openings, formed in one of end faces of the cassette shell and associated respectively with plural positions, the plural positions representing information of degrees of use of the photo film different from each other. An indicator plate is disposed in one of axial ends of the spool, rotatable together with the spool, and movable to the plural positions.

Furthermore, the lock projection is disposed with reference to a reference axial line, the reference axial line is determined on the first end wall, and adapted to setting of a center of the axial ends of the spool, and the lock projection is shaped with such an inclination that a radius of the lock projection with reference to the reference axial line decreases in a direction away from the first end wall.

To be precise, a case body is constituted by the peripheral wall and the first end wall, and open in one direction. A cap is constituted by the second end wall, secured to the case body for closing the case body.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
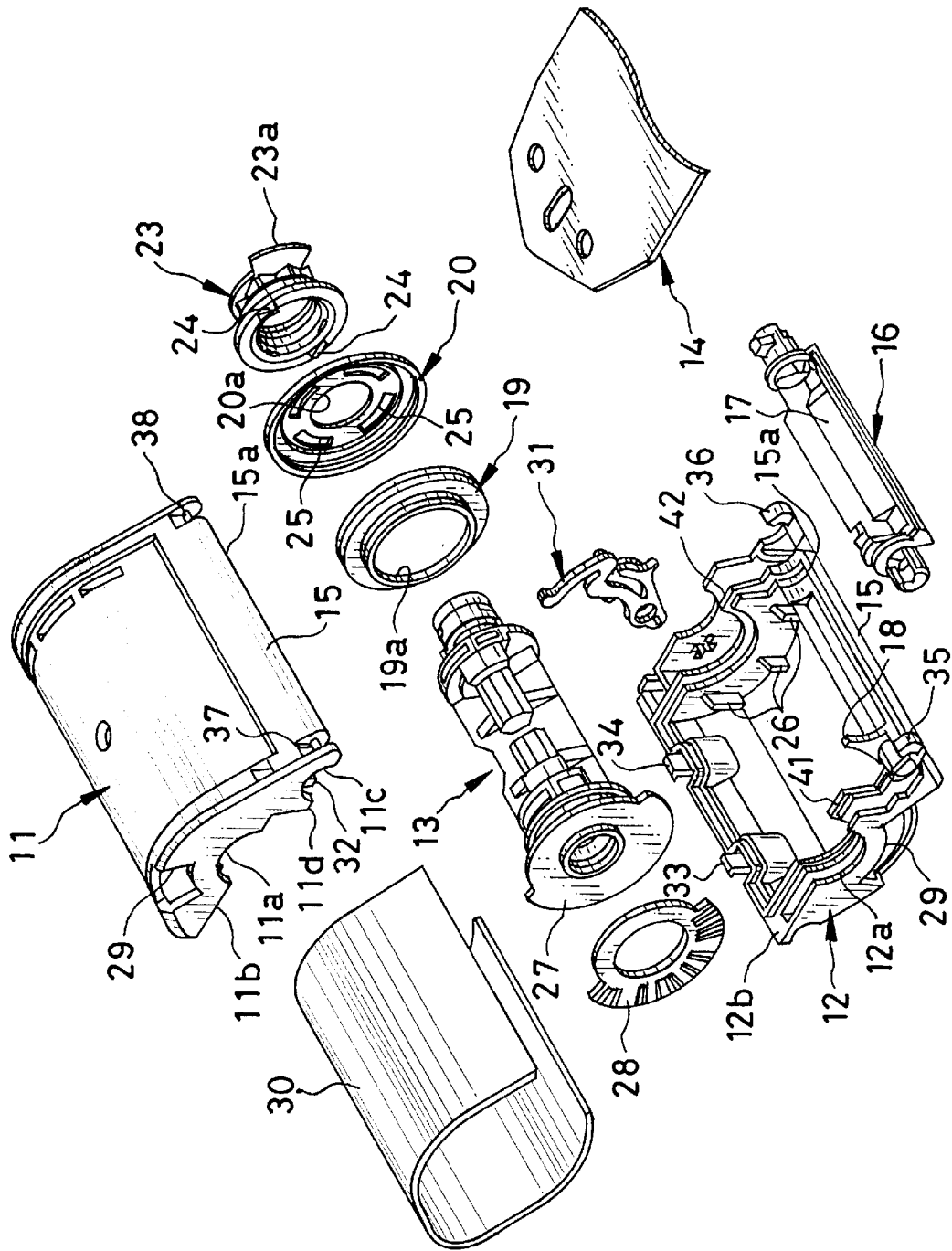
FIG. 1 is an exploded perspective illustrating a photo film cassette.

In FIG. 1, a cassette shell 10 is constituted by a pair of shell halves 11 and 12, which are respectively formed from resin. The cassette shell 10 contains a spool 13 in a rotatable manner. A strip of photo film 14 is wound about the spool 13 in a roll form.

The cassette shell 10 has a shape partly cylindrical and partly prismatic. The shell halves 11 and 12 of the cassette shell 10 have respective tongue portions 15 protruded therefrom. Before the shell half 12 is fitted on the shell half 11, a cassette shutter 16 is placed in the tongue portions 15 in a rotatable manner. The cassette shutter 16 has a photo film passageway 17 being flat. When the cassette shutter 16 is rotated in an open position, the passageway 17 constitutes a path of the photo film 14 advanced from the inside of the cassette shell 10. When the cassette shutter 16 is rotated to a closed position, a photo film slot 15a, as an exit of the tongue portions 15, is closed to shield the inside of the cassette shell 10 from ambient light.

There is a separator projection 18 formed on the shell half 12 in an inner position of the tongue portions 15. The separator projection 18 operates to guide a leading end of the photo film 14 toward the passageway 17 by separating it from the roll about the spool 13.

Flanges 19 and 20 have respective openings 19a and 20a. When the spool 13 is inserted through the openings 19a and 20a, the flanges 19 and 20 become disposed in predetermined positions along the spool 13, and are kept rotatable. There are circumferential lips 21 formed to protrude from the periphery of the flanges 19 and 20. The circumferential lips 21 partially cover the roll ends of the photo film 14 in contact with the outermost turn of the roll.

After an indicator member 23 is fitted on the spool 13, retaining holes 25 of the flange 20 are retained on clutch claws 24 when the spool 13 is rotated in an unwinding direction. Accordingly the flange 20 is rotated forcibly with the spool 13. When the spool 13 is rotated in a rewinding direction, the flange 20 is rotatable in a manner free from the spool 13, as the retaining holes 25 are not regulated by the clutch claws 24. The flange 19, in turn, is always rotatable relative to the spool 13. A sector-shaped indicator plate 23a is formed integrally with the indicator member 23. A position of the indicator plate 23a is recognized through an indicator window formed in the cassette shell 10 to detect a status of use of the photo film cassette.

There are ridges 26 formed with the inside of the shell halves 11 and 12, to keep the flanges 19 and 20 from spreading. A sector plate 27 is fixedly secured to the spool 13, and has a data disk sticker or label 28 attached thereto. The data disk sticker 28 has a rotational bar code printed thereon and including radially arranged bars. When the spool 13 is rotated, the bar code is photoelectrically detected through windows 29 formed in an end face of the cassette shell 10. Thus information can be electrically detected, including type information and frame number information of available frame number. A sticker 30 is attached on the cassette shell 10, and has printed information including photo film type and an identification number of the cassette. Note that it is possible to stamp the sector plate 27 of the spool 13 directly to form the rotary bar code, without using the data disk sticker 28.

When the cassette shutter 16 is rotated to a closed position, a spool lock member 31 blocks rotation of the spool 13. When the cassette shutter 16 is rotated to an open position, the spool 13 is released from the locking operation of the spool lock member 31. There is a lock pawl 32 formed integrally with the shell half 11. The cassette shutter 16 is locked by the lock pawl 32 when rotated in the closed position. A camera, a display device or another optical instrument for use with the photo film cassette includes an opener mechanism for opening the cassette shutter 16. When such an instrument is loaded with the photo film cassette, the opener mechanism releases the cassette shutter 16 from the lock of the lock pawl 32.

Figure 2:
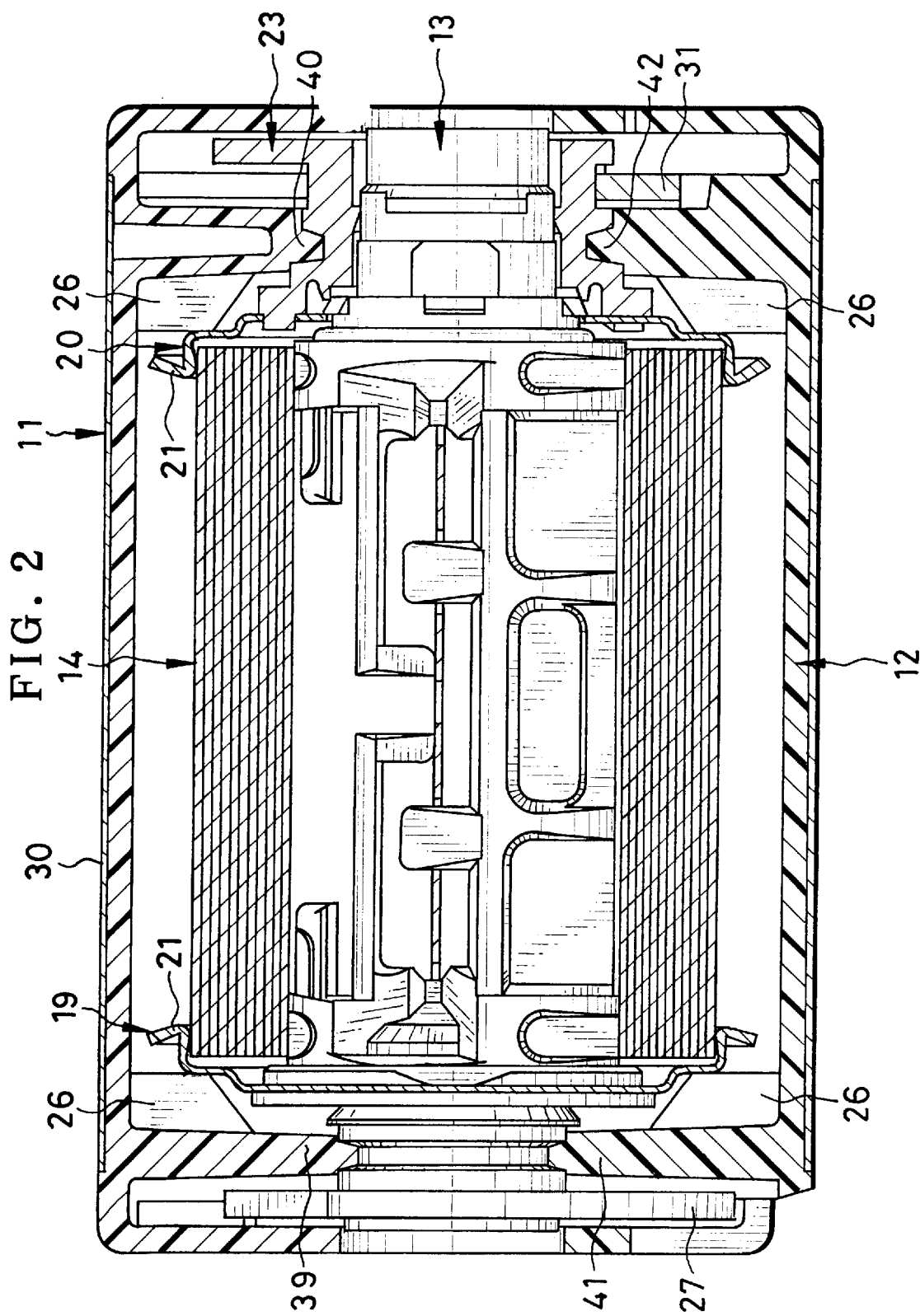
FIG. 2 is a horizontal section illustrating the photo film cassette.

In FIG. 2, the photo film 14 is entirely wound inside the cassette shell 10. The outermost turn of the photo film 14 is partially covered by the circumferential lips 21, and prevented from being unwound from about the spool 13. Thus the roll of the photo film 14 rotates together with the spool 13 when the spool 13 rotates in the winding direction of the photo film 14.

The inside ridges 26 on the inside of the shell halves 11 and 12 keep the flanges 19 and 20 from spreading. In the inner position in the tongue portions 15, an interval between the inside ridges 26 increases for the purpose of releasing the flanges 19 and 20 from the inside ridges 26. When the leading end of the photo film 14 is separated by the separator projection 18 to move into the passageway 17, the flanges 19 and 20 are spread externally to a slight extent. The photo film 14 is moved from between the circumferential lips 21 in a curled shape like an archway or a channel.

When a camera is loaded with the photo film cassette, a camera mechanism releases the cassette shutter 16 from retention of the lock pawl 32, and then rotates the cassette shutter 16 to the open position. Then the spool 13 is rotated in the unwinding direction to start advancing the photo film 14. The circumferential lips 21 prevent the photo film 14 from being unwound about the flanges 19 and 20, so that the roll of the photo film 14 rotates together with the spool 13. During the rotation, the leading end of the photo film 14 is separated by the separator projection 18 and guided to the inside of the passageway 17.

When the leading end of the photo film 14 is moved to the passageway 17, the circumferential lips 21 are spread by the photo film 14 in directions away from each other. The roll ends of the photo film 14 are released from being covered in the position inward from the passageway 17. The flange 20 is forcibly rotated in the unwinding direction via engagement between the clutch claws 24 and the retaining holes 25, so that force for advancing the photo film 14 is heightened. This being so, the photo film 14 is advanced to the outside of the cassette shell 10.

To rewind the photo film, the spool 13 is rotated in reverse. A trailing end of the photo film 14 is retained on the spool 13. The photo film 14 is wound into the cassette shell 10 by rotation of the spool 13. In the position inward from the passageway 17, the flanges 19 and 20 are spread. The photo film 14 is drawn into the position between the flanges 19 and 20 and wound about the spool 13.

Figure 3:
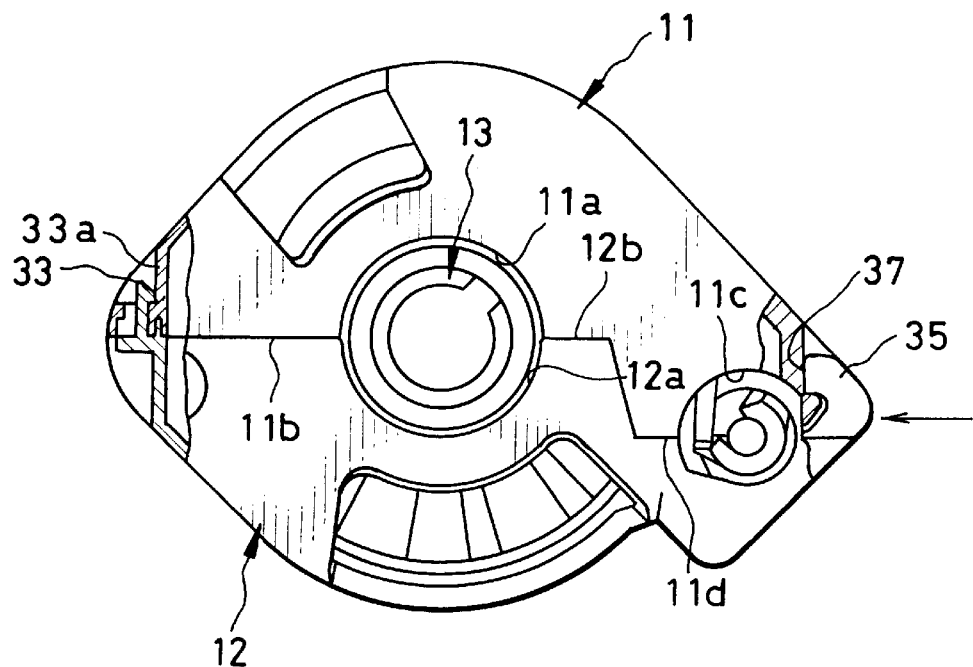
FIG. 3 is a side elevation, partially broken, illustrating the photo film cassette.

The shell halves 11 and 12 are joined together with a front joining line and a rear joining line. For the rear joining line, retaining claws 33 and 34 formed with the shell half 12 are engaged with receiving portions 33a formed with the shell half 11. In FIG. 3, only one of the receiving portions 33a is depicted. For the front joining line, first claw portions 35 and 36 are respectively engaged with second claw portions 37 and 38. The first claw portions 35 and 36 are formed with the shell half 12 and beside the tongue portions 15. The second claw portions 37 and 38 are formed with the shell half 11 and beside the tongue portions 15.

To join the shell half 11 with the shell half 12, at first the retaining claws 33 and 34 are engaged with the receiving portions 33a. At the same time as this or after this, the first claw portions 35 and 36 are engaged with the second claw portions 37 and 38. The first claw portions 35 and 36 are inserted either in a rotational direction defined about the rear joining line of the shell half 12, or while joining lines 11b and 12b are kept in parallel with each other beside an opening 12a. The first claw portions 35 and 36 are deformable resiliently in a direction of normal line of the inserting direction, namely in a direction vertical to the inserting direction.

Figure 4:
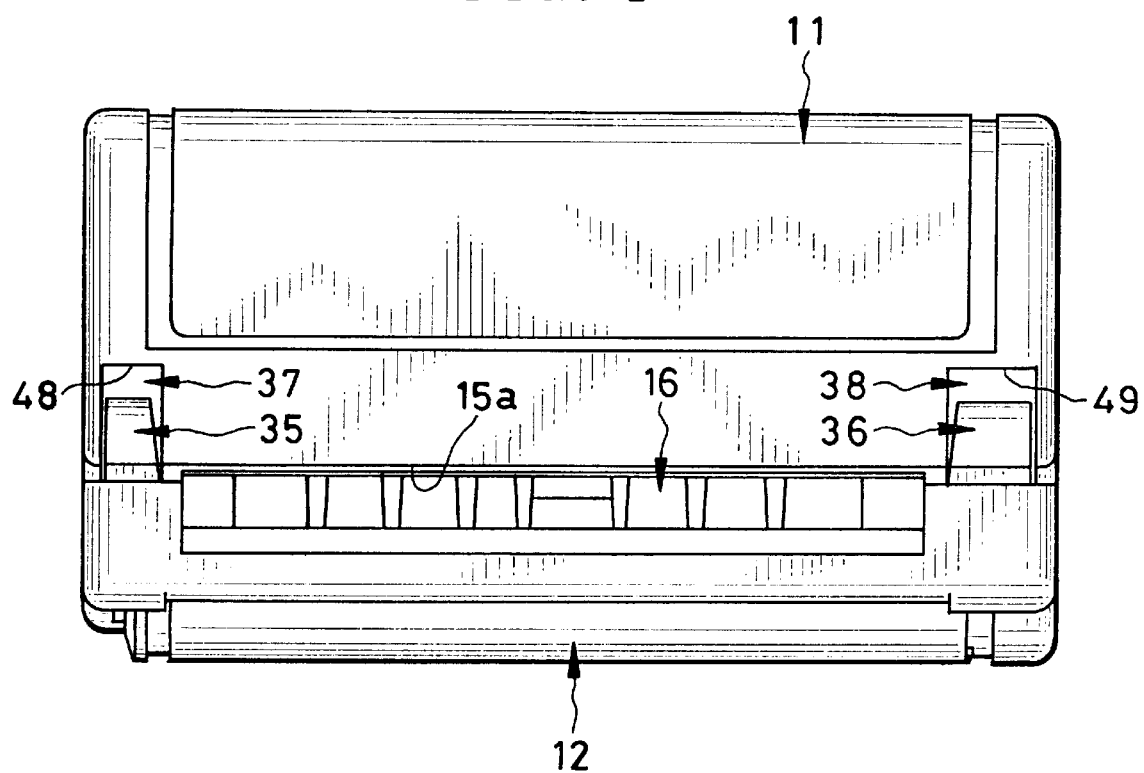
FIG. 4 is a front elevation illustrating the photo film cassette oriented diagonally.

In FIG. 4, the photo film slot 15a is disposed in a position deviated to the left. In other words, the claw portions 36 and 38 have a range longer than a range of the claw portions 35 and 37 with respect to a direction parallel with an axis of the spool 13.

Figure 5:
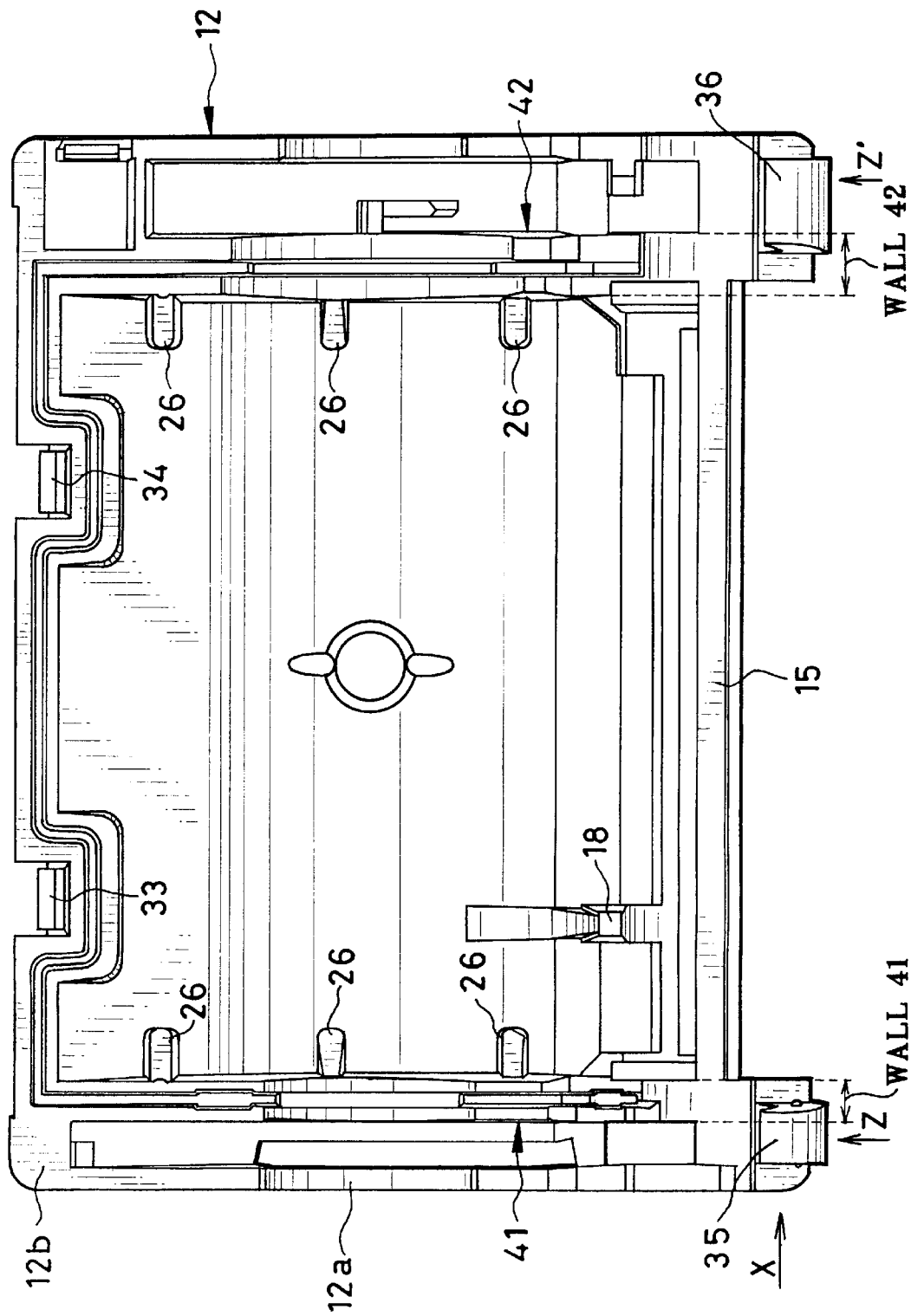
FIG. 5 is a plan illustrating a lower shell half of the cassette.

On the shell halves 11 and 12, light-shielding walls 39–42 are formed with their inside to protrude toward one another. See FIG. 2. The light-shielding walls 39–42, when the shell halves 11 and 12 are combined, support one end of the spool 13 and the indicator member 23 at the other end of the spool 13, and shield the inside of a chamber for the photo film 14 from ambient light. Among the light-shielding walls 39–42, the light-shielding walls 41 and 42 of the shell half 12 are depicted in FIG. 5. The light-shielding walls 39–42 are connected via a rear line passing through the retaining claws 33 and 34 and through the inside of the receiving portions 33a, and have a labyrinth shape with which each protruded portion is received in a recessed portion. The first claw portions 35 and 36, as shown, are disposed to lie on respective extensions of 41 and 42, and connects the light-shielding walls 39–42 without gaps between the shell halves 11 and 12.

Figure 6:
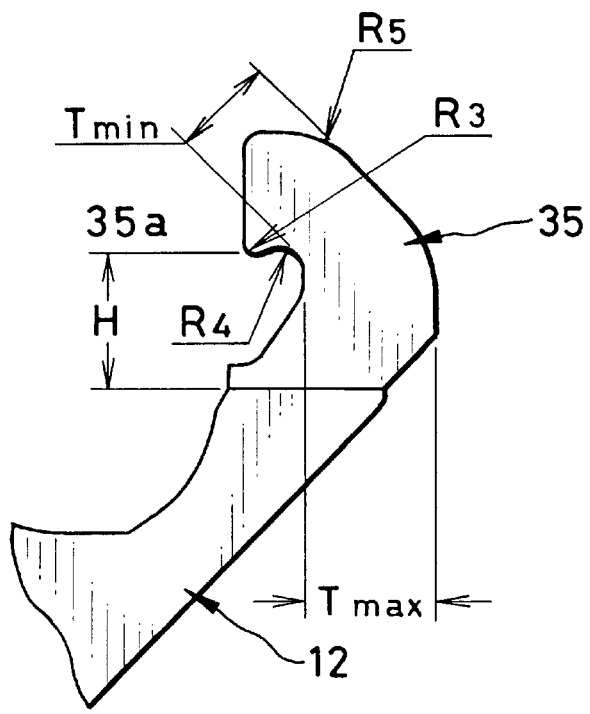
FIG. 6 is a side elevation illustrating a first claw portion of the lower shell half.
Figure 7:
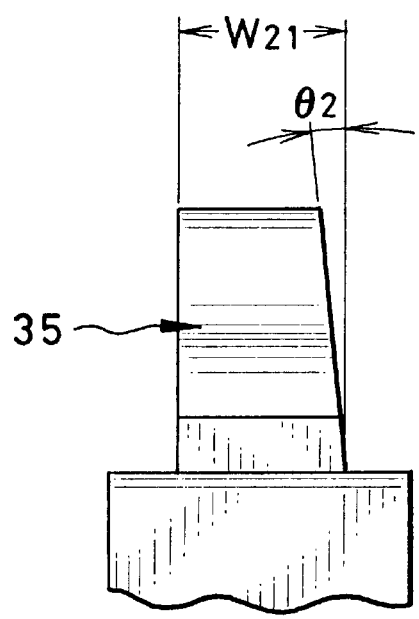
FIG. 7 is a front elevation illustrating the first claw portion.
Figure 8:
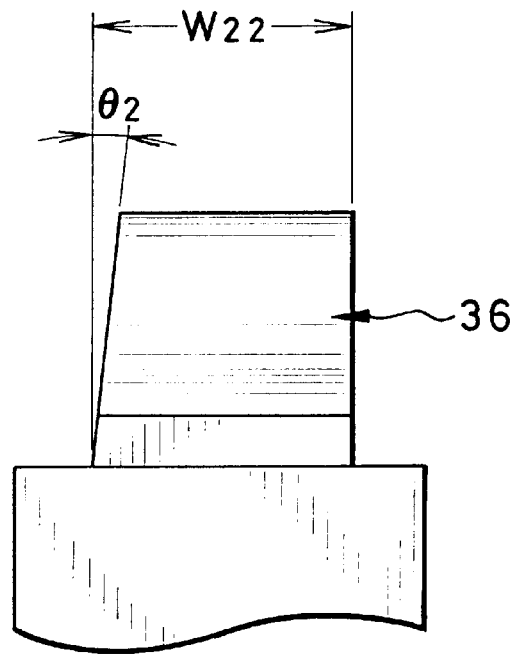
FIG. 8 is a front elevation illustrating another first claw portion of the lower shell half.

In FIG. 6, a first claw 35a is formed with an inner position of an end of the first claw portion 35 in a triangular shape viewed in section. The first claw portion 36 is similar to the first claw portion 35, and has a first claw formed with an inner position of its end in a triangular shape viewed in section. In FIG. 7, the first claw portion 35 has a draft or inclination on the side of the photo film slot 15a for use of convenience in molding. In FIG. 8, the first claw portion 36 has a draft or inclination on the side of the photo film slot 15a similarly.

Figure 10:
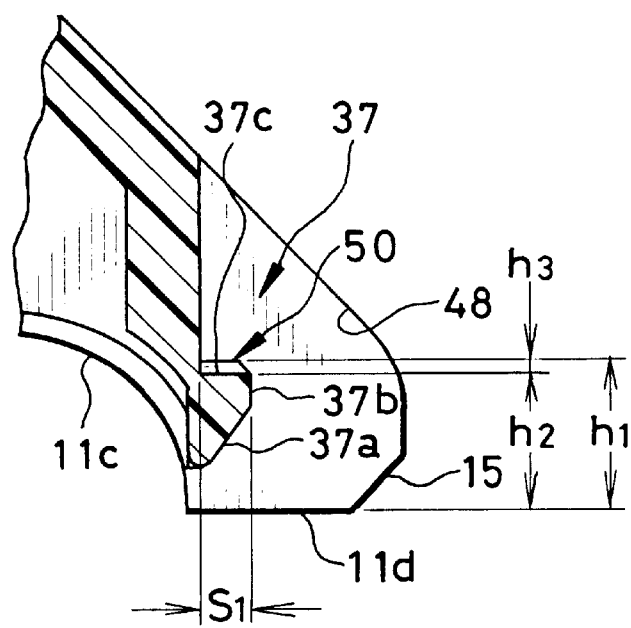
FIG. 10 is a side elevation, partially in section, illustrating a combination of the first claw portion and a second claw portion.
Figure 9:
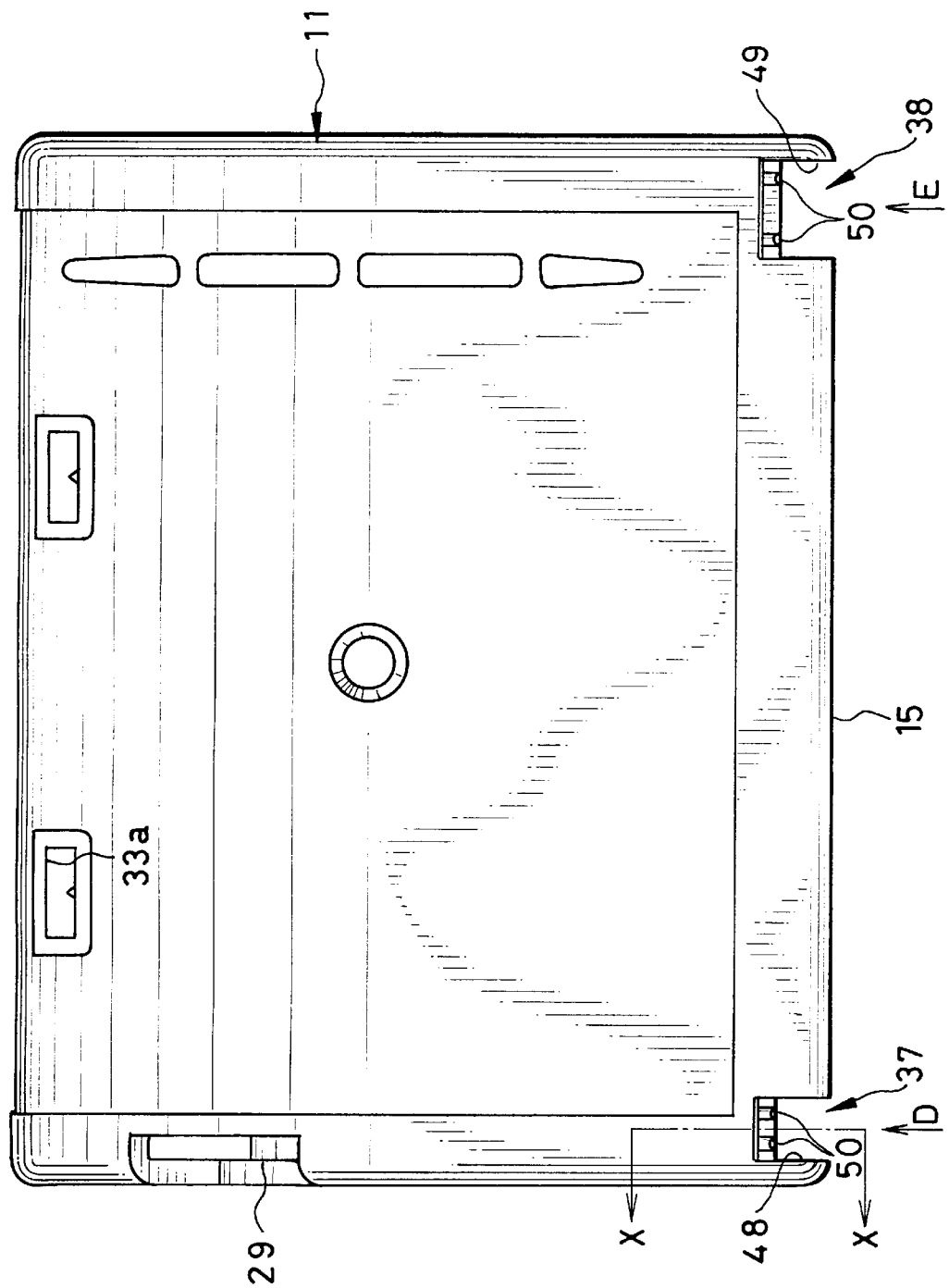
FIG. 9 is a plan illustrating an upper shell half of the cassette.

In FIG. 9, the second claw portions 37 and 38 are disposed in retracted positions inside securing cutouts 48 and 49, which are formed through the periphery of the shell half 11. The securing cutouts 48 and 49 are also open toward the front side where the tongue portions 15 is located. In FIG. 10, the second claw portion 37 is constituted by a deforming face 37a, a second claw 37b and an engaging face 37c. The deforming face 37a resiliently deforms the first claw 35a of the first claw portion 35. The second claw 37b prevents the first claw 35a from being disengaged. The engaging face 37c receives the first claw 35a fitted thereon. The second claw portion 38 is also constituted by a deforming face, a second claw and an engaging face. The second claw portion 38 is constructed in an equal manner to the second claw portion 37. The following description on the second claw portion 37 applies also to the second claw portion 38.

A surface defined by the engaging face 37c of the second claw portion 37 is formed in parallel with a joining line 11d, which is connected with an opening 11c through which each of axial ends of the cassette shutter 16 appears. Ridges 50 are formed integrally with the engaging face 37c, and protrude in a triangular shape and extend in an inserting direction of the first claw portion 35. The ridges 50 are partially deformed or collapsed by the first claw 35a and then is fitted on the first claw 35a tightly. The joining line 11d is substantially parallel with the joining line 11b of FIG. 3. The engaging face 37c may be inclined toward the slot 15a of the tongue portions 15 with reference to the joining line 11d. A preferable angle of the engaging face 37c is 0–30°.

Figure 11:
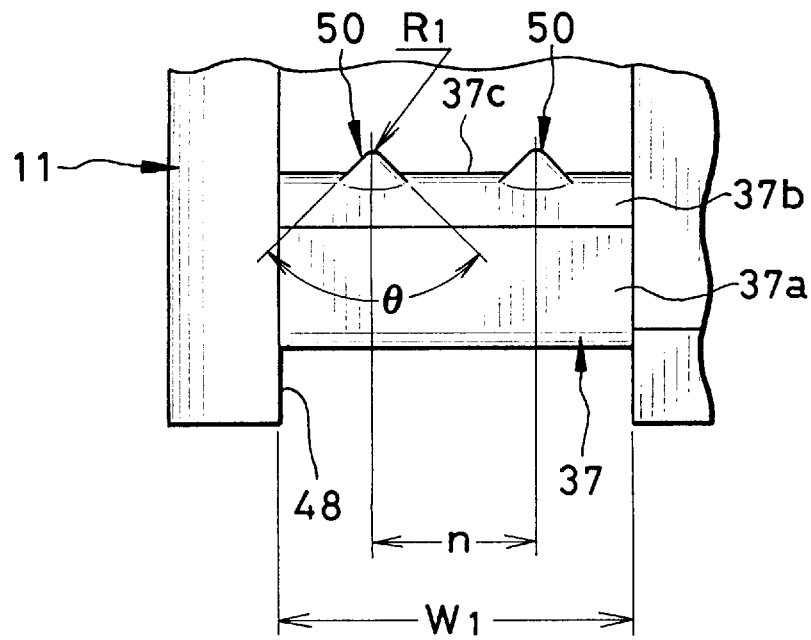
FIG. 11 is a front elevation illustrating a second claw portion of the upper shell half and with ridges.
Figure 12:
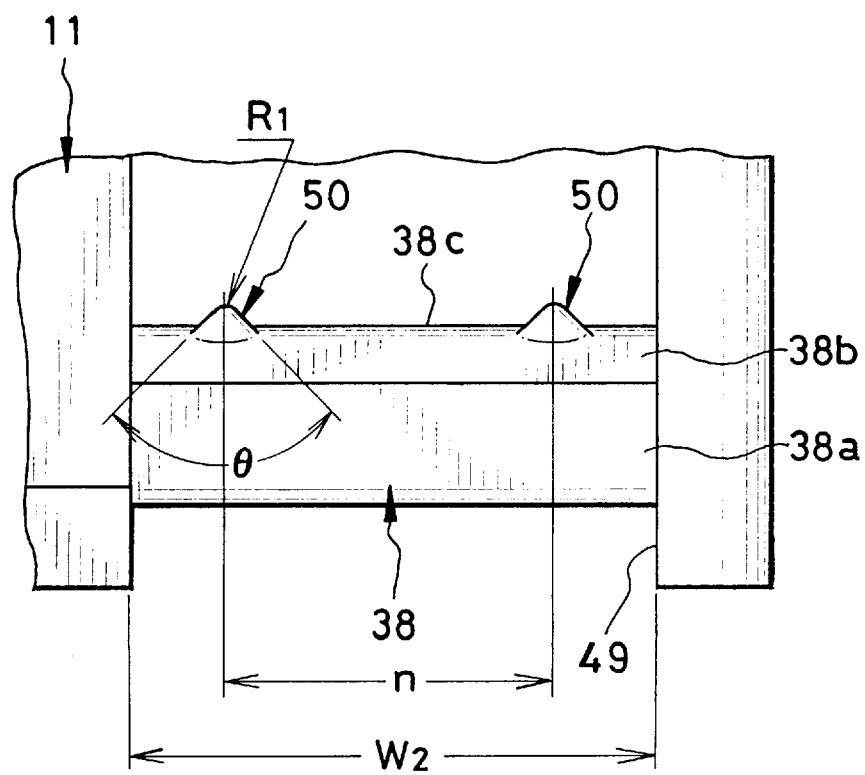
FIG. 12 is a front elevation illustrating another second claw portion with ridges.

In FIGS. 11 and 12, each of the second claw portions 37 and 38 has the two ridges 50. Note that the ridges 50 are triangular when viewed in the section, but may have any shape that can be deformed or collapsed by the first claw 35a. It is possible to form the one ridge 50 or the plural ridges 50 for each of the second claw portions 37 and 38. Preferably at most 10 ridges 50 may be formed in view of the small width. Reference numeral 38a designates a deforming face, and 38b a second claw.

The first claw portion 35 has such a size and shape that the first claw portion 35 remains pushed toward the second claw portion 37 after the engagement. Should the first claw 35a be sharply tapered, the second claw portion 37 would be abraded or scraped. To avoid this abrasion, an end of the first claw 35a is shaped with a curvature of which a radius is R3. See FIG. 6. Also an end of the ridges 50 is shaped with a curvature of which a radius is R1.

Figure 13:
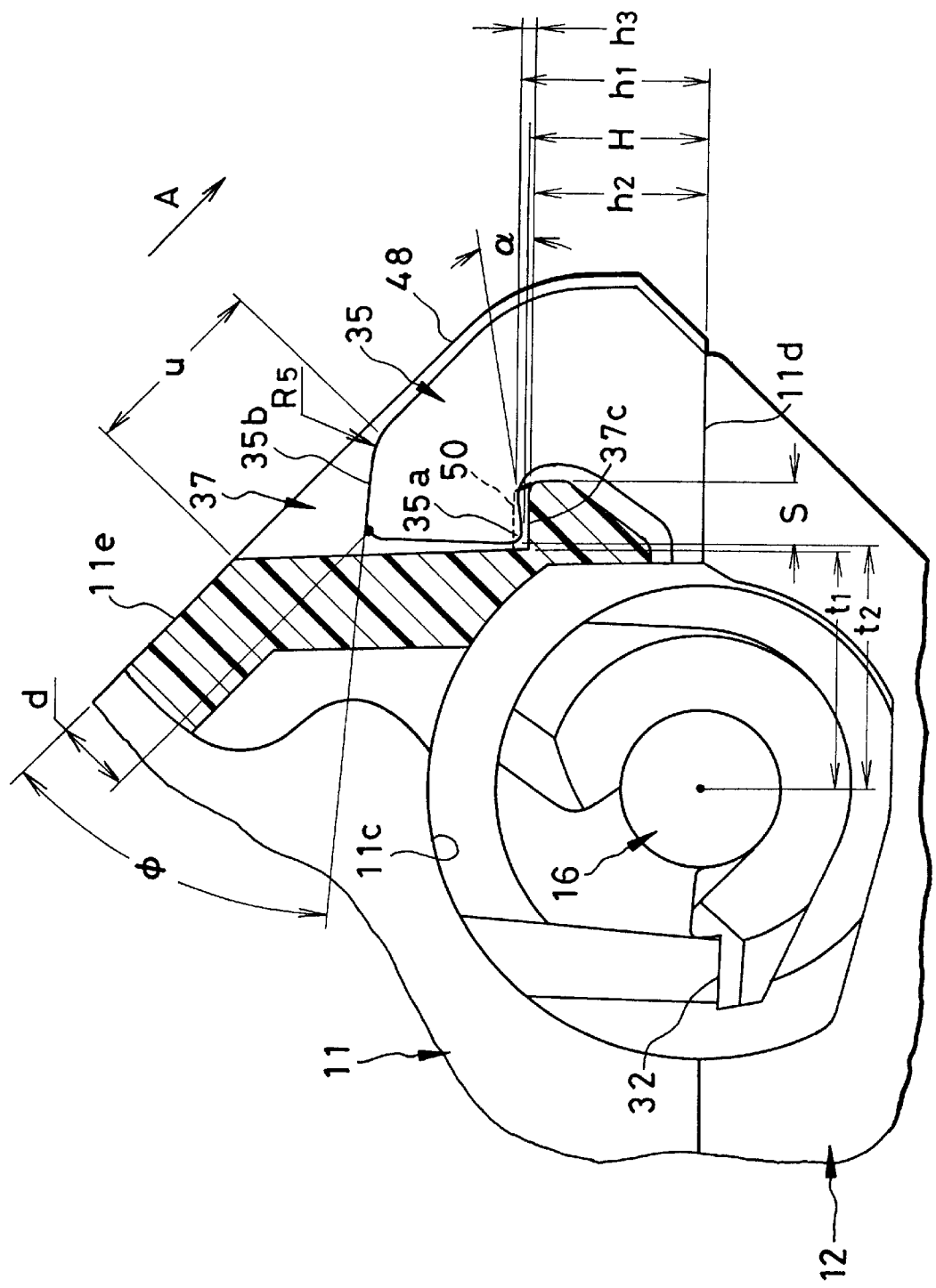
FIG. 13 is a side elevation, partially broken, illustrating the first and second claw portions with relevant dimensions indicated.

The ridges 50 have a slightly protruded shape with a small width. The first and second claw portions 35 and 37 are formed in such sizes that, when the shell halves 11 and 12 are joined together, the first claw portion 35 is kept pushed by the second claw portion 37. In FIG. 13, the first claw portion 35 is inserted while the first claw 35a collapses the ridges 50. Accordingly it is possible to absorb an error between the first and second claw portions 35 and 37 in a range of the height h1–h2 of the ridges 50. To set the height of the first claw portion 35 equal to that of the second claw portion 37, the following condition is satisfied:

$$h1 > H \geq h2$$

where h1 is a height of the ridges 50 with reference to the joining line 11d, H is a height of the first claw 35a with reference to the joining line 11d, and h2 is a height of the engaging face 37c with reference to the joining line 11d. Thus the first claw portion 35 collapses the ridges 50 partially in a reliable manner. The snap connection is ensured without considering errors in the sizes.

When the first claw 35a is positioned on the engaging face 37c, the first claw 35a is partially pushed into the ridges 50 in a vertically crossed manner, so that the shell half 12 is kept fixed on the shell half 11 without unwanted play.

A top face of the first claw portions 35 and 36 appears through the securing cutouts 48 and 49 externally. The sticker 30 does not cover the securing cutouts 48 or 49, so that it is likely that some user attempts to disengage the snap connection manually in an unacceptable manner. To avoid this situation, it is preferred to form the securing cutouts 48 and 49 and the first claw portions 35 and 36 in such sizes that no finger of users can move the first claw portions 35 and 36 even when inserted slightly through the securing cutouts 48 and 49.

Figure 14:
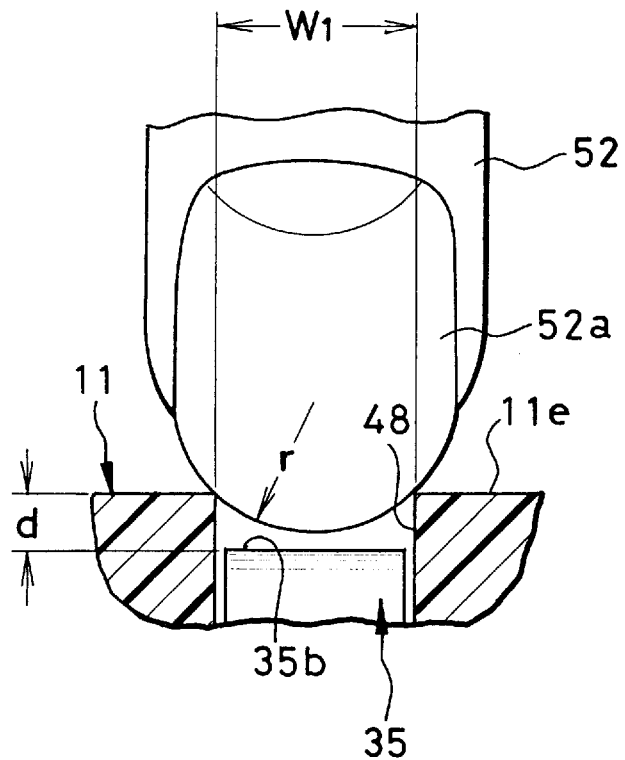
FIG. 14 is an explanatory view, partially in section, illustrating a relationship of the first claw portion with a finger.

In FIG. 14, a finger or thumb 52 is placed at the securing cutout 48 in the shell half 11 to bring a nail 52a of the finger 52 closer to an outer retracted face 35b of the first claw portion 35 with a gap. A direction of access of the finger 52 is indicated by the arrow A in FIG. 13. A tip point to which the fingernail 52a is directed is located on the outer retracted face 35b, and indicated by a black dot in FIG. 13. Let d be a depth of the outer retracted face 35b with reference to an edge of the securing cutout 48. Let $W_1$ be a width of the securing cutout 48 in a direction vertical of the inserting direction of the first claw portion 35. Let r be a radius of curvature of an end of the fingernail 52a. The outer retracted face 35b and the securing cutout 48 satisfies a condition:

$$[r^2-(W_1^2/4)]^{1/2}>r-d$$

so as to prevent the fingernail 52a from moving down beyond the outer retracted face 35b. It is possible to consider that a minimum of the radius r is approximately 4 mm. Therefore the outer retracted face 35b and the securing cutout 48 can satisfy a condition:

$$[16-(W_1^2/4)]^{1/2}>4-d$$

where W1 and d are in millimeters.

Figure 15:
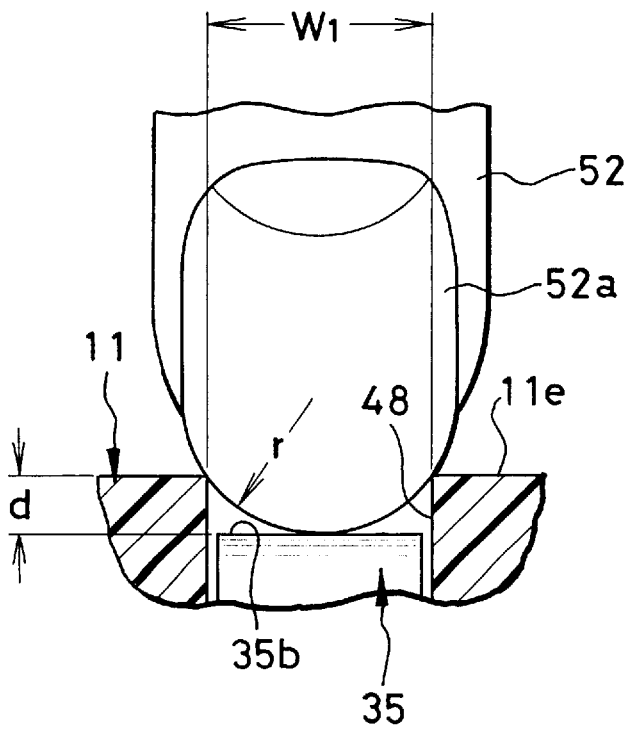
FIG. 15 is an explanatory view, partially in section, illustrating a relationship of a modified first claw portion with a finger.

In FIG. 15, the fingernail 52a enters only to contact the outer retracted face 35b. In this case, no finger of users can move the first claw portion 35 even when inserted through the securing cutout 48. As a result, the condition with a final slight modification can be:

$$[r^2-(W_1^2/4)]^{1/2} \geq r-d$$

Figure 16:
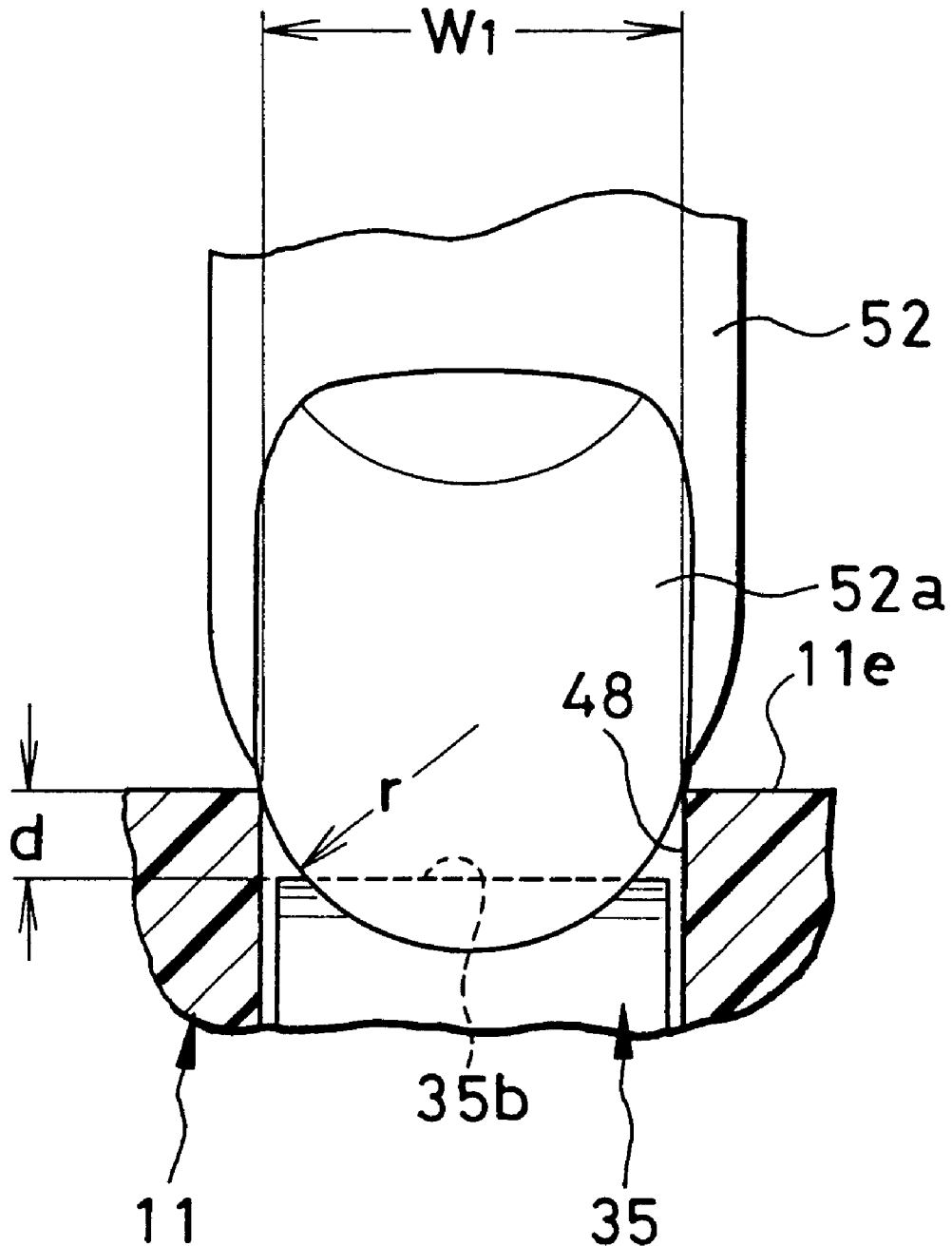
FIG. 16 is an explanatory view, partially in section, illustrating a relationship of a first claw portion of a comparable example with a finger.

FIG. 16 shows a comparable example satisfying $$[r^2-(W_1^2/4)]^{1/2}<r-d$$

The fingernail 52a will move the outer retracted face 35b, as the fingernail 52a can be entered to a position under the outer retracted face 35b.

In FIG. 13, let $\phi$ be an angle defined between the outer retracted face 35b of the first claw portion 35 and an upper surface 11e of the shell half 11. The angle $\phi$ is determined sufficiently great. The depth d of the outer retracted face 35b can be relatively great, to ensure avoidance of entry of the fingernail 52a. Also the length u of the gap defined by the outer retracted face 35b and the securing cutout 48 can be shortened, with effectiveness for avoiding entry of the fingernail 52a. It is also preferred that both ends of the outer retracted face 35b can be curved or rounded off for the same purpose.

EXAMPLE

Examples of the preferred sizes of the present embodiment is indicated below. Of course the present invention is not limited to those examples.

LIST 1 h1: height of the ridges 50 above-described with FIG. 13
  preferably from 1 mm to 4 mm, desirably from 1.5 mm to 3 mm.
h2: height of the engaging face 37c above-described with FIG. 13
  preferably from 1 mm to 4 mm, desirably from 1.5 mm to 3 mm.
h3: height of the ridges 50, h1–h2
  preferably from 0.05 mm to 1 mm, desirably from 0.05 mm to 0.5 mm.
H: height of the first claw 35a above-described with FIG. 13
  preferably from 1 mm to 4 mm, desirably from 1.5 mm to 3 mm.
h1–H: collapsed amount of the ridges 50 (clearance if negative)
  preferably from –0.05 mm to 0.2 mm, desirably from 0 mm to 0.2 mm.
H–h2: clearance between the first claw 35a and the engaging face 37c
  preferably from –0.05 mm to 0.15 mm, desirably from 0 mm to 0.15 mm.
S: depth of retention of the first claw 35a and the engaging face 37c in FIG. 13
  preferably from 0.2 mm to 1.5 mm, desirably from 0.4 mm to 1 mm.
$\alpha$: angle of the first claw 35a relative to the engaging face 37c
  preferably from 2° to 45°, desirably from 5° to 30 °.
t1: distance between an axial center of the cassette shutter 16 and an end of the second claw portion 37
  preferably from 1 mm to 4 mm, desirably from 1.5 mm to 3 mm.
t2: distance between an axial center of the cassette shutter 16 and the first claw 35a
  preferably from 1 mm to 4 mm, desirably from 1.5 mm to 3 mm.
t2–t1: a space between the second claw portion 37 and the first claw 35a
  preferably from –2 mm to 1 mm, desirably from –0.5 mm to 0.5 mm.
d: depth of the outer retracted face 35b of the first claw portion 35 with reference to the securing cutouts 48 and 49
  preferably from 0.01 mm to 3 mm, desirably from 0.2 mm to 2 mm.
$\phi$: angle defined between the outer retracted face 35b of the first claw portion 35 and the upper surface 11e of the shell half 11
  preferably from 5° to 135°, desirably from 20° to 90°.
R5: radius of curvature of an outer corner of the outer retracted face 35b in FIG. 13
  preferably from 0.2 mm to 10 mm, desirably from 0.5 mm to 5 mm.
u: distance between an edge of the securing cutout 48 and the outer corner of the outer retracted face 35b
  preferably from 0.5 mm to 5 mm, desirably from 1 mm to 3 mm.
R1: radius of curvature of tips of the ridges 50
  preferably from 0 mm to 1 mm, desirably from 0.05 mm to 0.5 mm.
$\theta$: angle of the triangular shape of the ridges 50 in FIGS. 11 and 12
  preferably from 10° to 135°, desirably from 45° to 120°.
n: interval between the ridges 50
  preferably from 0.5 mm to 5 mm, desirably from 0.8 mm to 4 mm.
W1: width of the second claw portion 37 and of the securing cutout 48
  preferably from 0.5 mm to 4 mm, desirably from 1 mm to 3 mm.
W2: width of the second claw portion 38 and of the securing cutout 49
  preferably from 1 mm to 6 mm, desirably from 2 mm to 5 mm.
S1: length of the engaging face 37c in FIG. 10
  preferably from 0.3 mm to 3 mm, desirably from 0.5 mm to 1.5 mm.
W21: width of a root of the first claw portion 35 in FIG. 7
  preferably from 0.5 mm to 5 mm, desirably from 1 mm to 3 mm.
W22: width of a root of the first claw portion 36 in FIG. 8
  preferably from 0.5 mm to 5 mm, desirably from 2 mm to 4 mm.
W1–W21 and W2–W22: intervals between the first and second claw portions 35 and 37 and between the first and second claw portions 38 and 36
  preferably from 0 mm to 1 mm, desirably from 0.1 mm to 0.5 mm.

R3: radius of curvature of the claw end of the first claw 35a in FIG. 6
preferably from 0 mm to 1 mm, desirably from 0.05 mm to 0.5 mm.
R4: radius of the inside of the first claw portion 35 in FIG. 6
preferably from 0.1 mm to 5 mm, desirably from 0.2 mm to 1 mm.
θ2: draft of the first claw portions 35 and 36 in FIGS. 7 and 8
preferably from 0° to 10°, desirably from 2° to 8°.
Tmin: minimum thickness of the first claw portion 35 in FIG. 6
preferably from 0.3 mm to 3 mm, desirably from 1 mm to 2 mm.
Tmax: maximum thickness of the first claw portion 35 in FIG. 6
preferably from 0.5 mm to 4 mm, desirably from 1.2 mm to 2.5 mm.

Experiments were conducted for the purpose of testing intensity of snap connection. Cassettes were dropped after changing the collapsed amount (h1–H) of the ridges 50 and the clearance (H–h2) between the first claw 35a and the engaging face 37c or between a first claw 36a and an engaging face 38c.

TEST 1
The collapsed amount (h1–H) was 0.2 mm. The clearance (H–h2) was −0.05 mm. 10 samples of the photo film cassette were prepared, and were dropped down to an iron plate from a height of 1 (one) meter. Each sample was dropped 10 times. As a result, all the samples were safe in the snap connection without disengagement.

TEST 2
The collapsed amount (h1–H) was 0.1 mm. The clearance (H–h2) was 0.05 mm. 10 samples of the photo film cassette were prepared, and were dropped down to an iron plate from a height of 1 (one) meter. Each sample was dropped 40 times. As a result, all the samples were safe in the snap connection without disengagement.

TEST 3
The collapsed amount (h1–H) was 0. The clearance (H–h2) was 0.15 mm. 10 samples of the photo film cassette were prepared, and were dropped down to an iron plate from a height of 1 (one) meter. Each sample was dropped 40 times. As a result, all the samples were safe in the snap connection without disengagement.

TEST 4
The collapsed amount (h1–H) was 0.2 mm. The clearance (H–h2) was −0.05 mm. 10 samples of the photo film cassette were prepared, and were dropped down to an iron plate from a height of 2 (two) meters. Each sample was dropped 10 times. As a result, upon the first drop, there was one of the samples where the first claw portion 36 was disengaged.

TEST 5
The collapsed amount (h1–H) was 0.1 mm. The clearance (H–h2) was 0.05 mm. 10 samples of the photo film cassette were prepared, and were dropped down to an iron plate from a height of 2 (two) meters. Each sample was dropped 10 times. As a result, all the samples were safe in the snap connection without disengagement.

TEST 6
The collapsed amount (h1–H) was 0. The clearance (H–h2) was 0.15 mm. 10 samples of the photo film cassette were prepared, and were dropped down to an iron plate from a height of 2 (two) meters. Each sample was dropped 10 times. As a result, all the samples were safe in the snap connection without disengagement.

TEST 7
The collapsed amount (h1–H) was −0.05 mm. The clearance (H–h2) was 0.15 mm. 10 samples of the photo film cassette were prepared, and were dropped down to an iron plate from a height of 2 (two) meters. Each sample was dropped 10 times. There existed clearance between the first claw 35a and the ridges 50 because of −0.05 mm as (h1–H). However all the samples were safe in the snap connection without disengagement. It is observed that the ridges 50 were located in the removing direction of the first claw 35a due to the smallness of the clearance 0.05 mm, and the first claw 35a was stuck on the ridges 50 without removal.

TEST 8
The collapsed amount (h1–H) was 0.2 mm. The clearance (H–h2) was −0.05 mm. 10 samples of the photo film cassette were prepared, preserved at a temperature of 50° centigrade, returned to an environment of a room temperature, and immediately dropped down to an iron plate from a height of 1 (one) meter. Each sample was dropped 10 times. As a result, upon the seventh drop, there was one of the samples where the first claw portion 36 was disengaged.

TEST 9
The collapsed amount (h1–H) was 0.1 mm. The clearance (H–h2) was 0.05 mm. 10 samples of the photo film cassette were prepared, preserved at a temperature of 50° centigrade, returned to an environment of a room temperature, and immediately dropped down to an iron plate from a height of 1 (one) meter. Each sample was dropped 10 times. As a result, all the samples were safe in the snap connection without disengagement.

TEST 10
The collapsed amount (h1–H) was 0. The clearance (H–h2) was 0.15 mm. 10 samples of the photo film cassette were prepared, preserved at a temperature of 50° centigrade, returned to an environment of a room temperature, and immediately dropped down to an iron plate from a height of 1 (one) meter. Each sample was dropped 10 times. As a result, all the samples were safe in the snap connection without disengagement.

TEST 11
The collapsed amount (h1–H) was 0.2 mm. The clearance (H–h2) was −0.05 mm. 10 samples of the photo film cassette were prepared, preserved at a temperature of 50° centigrade, returned to an environment of a room temperature, and immediately dropped down to an iron plate from a height of 2 (two) meters. Each sample was dropped 10 times. As a result, upon the first drop, there was one of the samples where the first claw portion 35 was disengaged. Upon the third drop, there were two of the samples where the first claw portion 35 was disengaged. Upon the fourth drop, there was one of the samples where the first claw portion 35 was disengaged. Upon the eighth drop, there was one of the samples where the first claw portion 35 was disengaged. Upon the ninth drop, there was one of the samples where the first claw portion 35 was disengaged.

TEST 12
The collapsed amount (h1–H) was 0.1 mm. The clearance (H–h2) was 0.05 mm. 10 samples of the photo film cassette were prepared, preserved at a temperature of 50° centigrade, returned to an environment of a room temperature, and immediately dropped down to an iron plate from a height of 2 (two) meters. Each sample was dropped 10 times. As a result, all the samples were safe in the snap connection without disengagement.

TEST 13
The collapsed amount (h1–H) was 0. The clearance (H–h2) was 0.15 mm. 10 samples of the photo film cassette were prepared, preserved at a temperature of 50° centigrade, returned to an environment of a room temperature, and immediately dropped down to an iron plate from a height of 2 (two) meters. Each sample was dropped 10 times. As a result, all the samples were safe in the snap connection without disengagement.

TESTS 11–13 were so severely conditioned that the samples were preserved at a temperature of 50° centigrade, and immediately dropped down to an iron plate from a height of 2 (two) meters. The quality regarded as acceptable after TESTS 11–13 may be excessively high over a sufficient quality. Anyway the results of TESTS 1–10 show effective reliability of the snap connection. Accordingly the collapsed amount (h1–H) is in the preferable range from −0.05 mm to 0.2 mm. The clearance (H–h2) between the first claw 35a and the engaging face 37c or between the first claw 36a and the engaging face 38c is in the preferable range from −0.05 mm to 0.15 mm.

When the collapsed amount (h1–H) is negative, there occurs a play between the shell halves 11 and 12. This is not suitable in view of light-shielding capacity. Consequently a desirable range of the collapsed amount (h1–H) of the ridges 50 is from 0 mm to 0.2 mm. When the clearance (H–h2) is negative, there occurs a difficulty in connecting the shell halves 11 and 12. Consequently a desirable range of the clearance (H–h2) between the first claw 35a and the engaging face 37c and between the first claw 36a and the engaging face 38c is from 0 mm to 0.15 mm.

Figure 29:
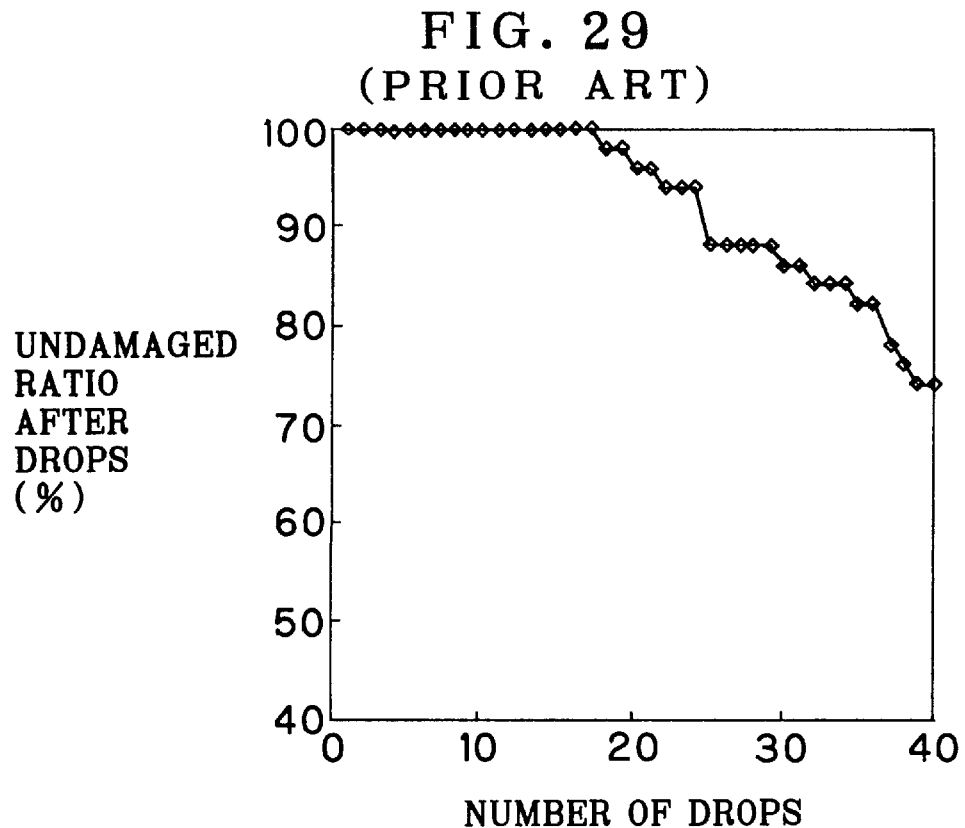
FIG. 29 is a graph illustrating a relationship between the number of drops of cassettes of the prior art from a height of 1 (one) meter and a ratio of undamaged cassettes after drops.
Figure 30:
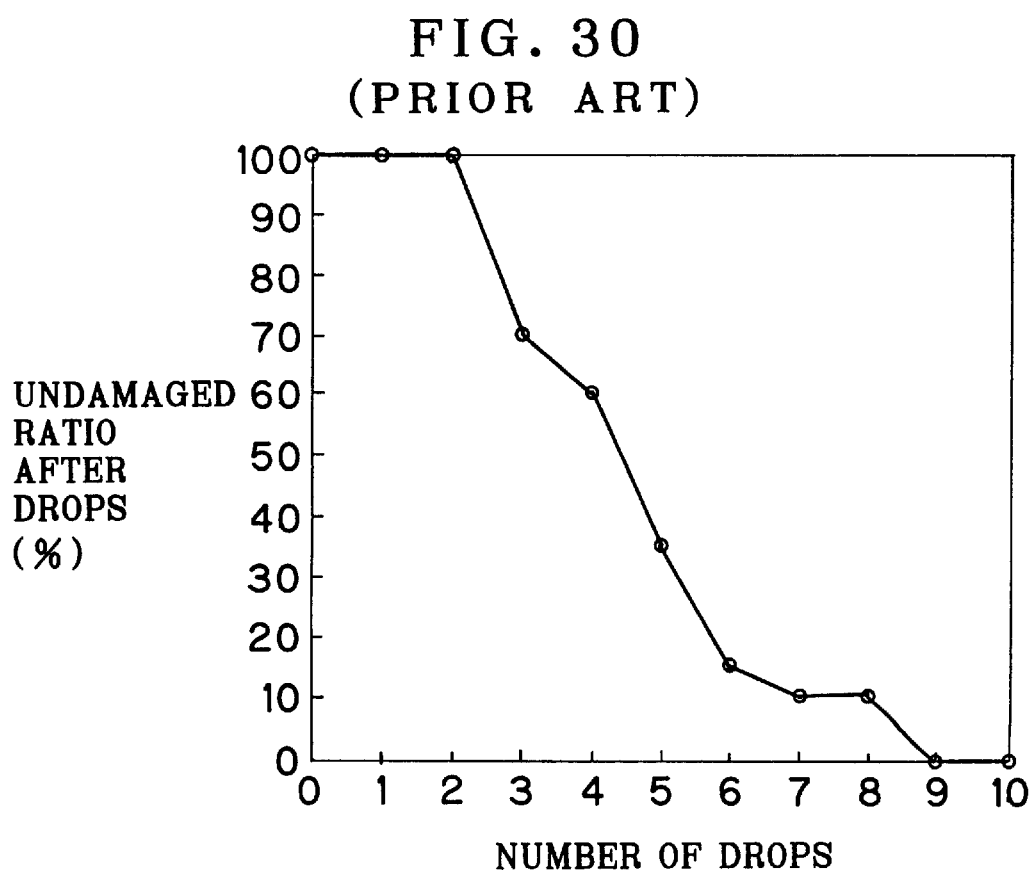
FIG. 30 is a graph illustrating a relationship between the number of drops of cassettes of the prior art from a height of 2 (two) meters and a ratio of undamaged cassettes after drops.

Examples of the known photo film cassette according to the prior art were also tested. In FIGS. 29 and 30, results of the tests are shown. Plural examples were dropped down from a height of various values. Each example was dropped plural times. Graphs were obtained for a relationship between a ratio of undamaged ones of the examples after drops and the number of drops. Note that the examples had the claws and receiving portions engaged together and welded together by means of ultrasonic welding.

The graph of FIG. 29 was obtained after samples were dropped from a height of 1 (one) meter. Approximately 74% of the samples were undamaged at the end of 40 drops. The graph of FIG. 30 was obtained after samples were dropped from a height of 2 (two) meters. Approximately 70% of the samples were undamaged at the end of 3 drops. In comparison with those samples, the cassette of the present invention according to TESTS 2–7 was found to have remarkably heightened resistance to drop. This novel structure is effective in raising intensity of the snap connection.

Note that it is possible in the present invention to use ultrasonic welding for the purpose of more firmly connecting the first claw portion 35 to the second claw portion 37 or the first claw portion 36 to the second claw portion 38, or for the purpose of avoiding play between the shell halves 11 and 12. After the welding, the ultrasonic horn melts the first claw 35a and the ridges 50 to fit the first claw portion 35 tightly on the engaging face 37c. In short, the first claw 35a and the ridges 50 operate as an energy director, which is fixed to an extent determined in consideration of a melted amount.

For the welding, an ultrasonic horn is inserted through the securing cutouts 48 and 49, and pushed on to the first claw portions 35 and 36 toward the engaging face 37c and 38c to a predetermined extent. As soon as the push of the ultrasonic horn reaches the predetermined extent, the ultrasonic horn is stopped from pushing. During the push, the ultrasonic horn applies ultrasonic wave by an oscillating operation. At the same time as the stop of the push of the ultrasonic horn, the ultrasonic wave is stopped to finish the welding operation.

Note that it is preferable to use a single horn to push the first claw portions 35 and 36 at the same time. Of course two horns may be used to push the first claw portions 35 and 36 either at the same time or one after another. It is necessary with the two horns to control the welding condition so as to maintain the connecting force after the welding. In addition, it is possible to weld only one of the first claw portions 35 and 36 without welding the other of them.

The above embodiment has the ridges 50. However the ridges 50 may be omitted typically if prevention of disengaging the snap connection is intended. The first claw 35a should be parallel with the joining line 11d, and should be formed in the sizes in List 2 below. Signs in List 2 are clearly indicated in FIG. 17. The phantom line in FIG. 17 indicates a form of the first claw portion 35 prior to the connection. After the connection, the first claw portion 35 is kept pushed by the second claw portion 37, and remains deformed in a position of the solid line. Furthermore, the first claw portion 35 is thickest in a position of half its height.

Figure 17:
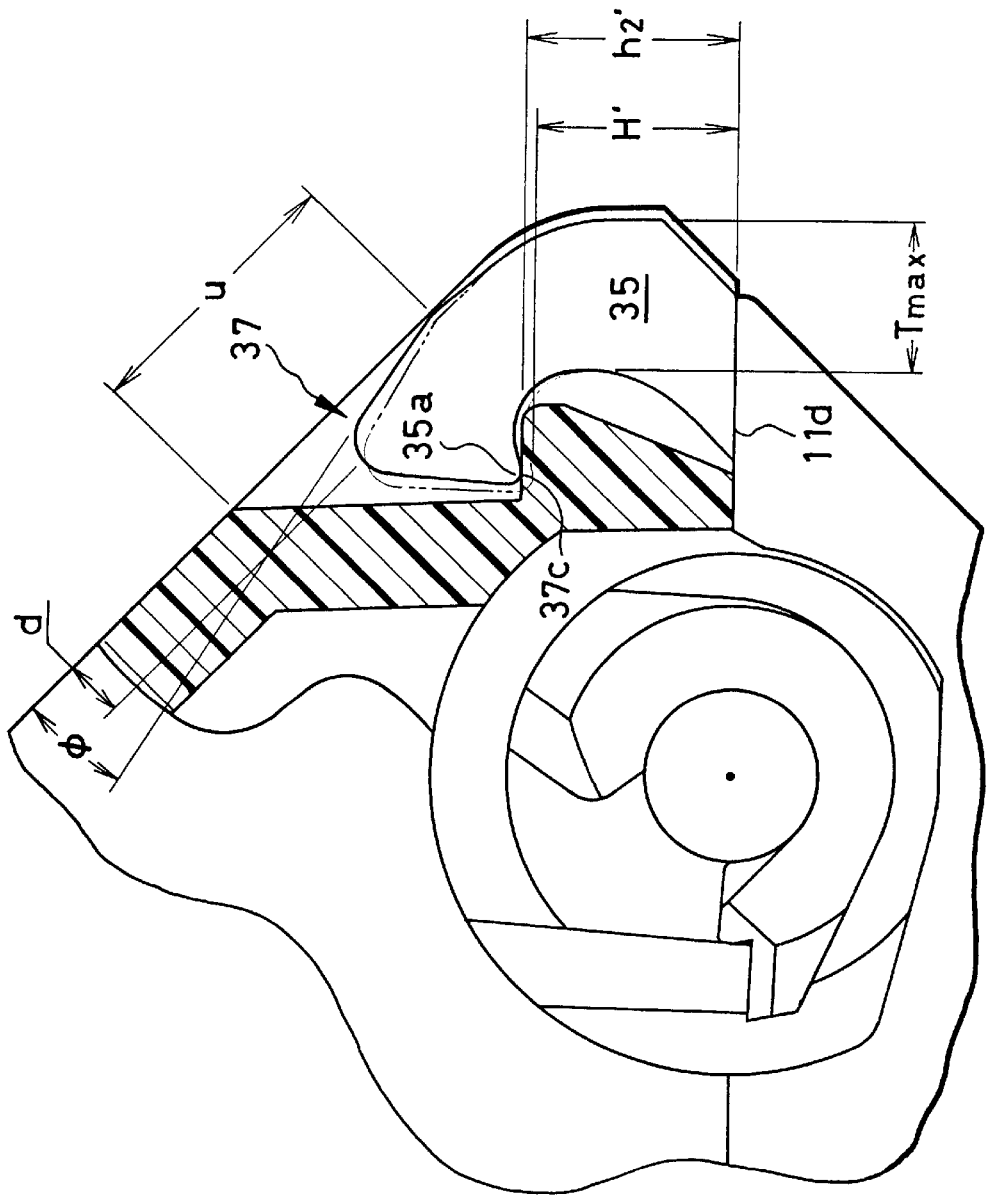
FIG. 17 is a side elevation, partially broken, illustrating another preferred embodiment without ridges on a second claw portion.

LIST 2 h2': height of the engaging face 37c with reference to the joining line 11d in FIG. 17
  preferably from 1 mm to 4 mm, desirably from 1.5 mm to 3 mm.
H': height of the first claw 35a with reference to the joining line 11d in FIG. 17
  preferably from 1 mm to 4 mm, desirably from 1.5 mm to 3 mm.
h2'–H': deformed amount of the first claw portion 35 (distance between positions before and after the connection)
  preferably from 0 mm to 0.5 mm, desirably from 0 mm to 0.3 mm.
Tmax: maximum thickness of the first claw portion 35
  preferably from 0.5 mm to 4 mm, desirably from 1 mm to 2 mm.

In the above embodiments, the second claw portions 37 and 38 are included in the shell half 11. The first claw portions 35 and 36 are included in the shell half 12. Alternatively the second claw portions 37 and 38 may be formed with the shell half 12. The first claw portions 35 and 36 may be formed with the shell half 11.

Furthermore, the first claw portions 35 and 36 and the second claw portions 37 and 38 of the present invention may satisfy only the condition:

$$h1 > H \geq h2$$

while having the feature of FIG. 16 without satisfying $$[r^2 - (W_1^2/4)]^{1/2} \geq r - d.$$

In addition, the first claw 35a, the second claw 37b and the ridges 50 may satisfy $$h1 - H \geq -0.05 \text{ mm}$$

and $$H - h2 \geq -0.05 \text{ mm}$$

as is concluded by the experiments described above.

In view of suitability to mass production and cost, thermoplastic resin is preferred for material of the cassette shell. Light-shielding material can be added to the resin. Ratio of carbon black as light-shielding material can be in a range of 0.05–3.00 wt. %. The resin can be provided with addition of lubricant (silicone oil etc.), antistatic, inorganic or organic pigment (titanium oxide etc.), processing aid (zinc stearate etc.), antioxidant, nucleator, and plasticizer, and the like, in amounts as much as required.

Examples of the resin are polystyrene, high-impact polystyrene, styrene-acrylonitrile copolymer, acrylonitrilebutadiene-styrene (ABS) copolymer, polypropylene resin, high-density polyethylene resin, polyethylene terephthalate, polybutylene terephthalate, polycarbonate resin, polyvinyl chloride, and modified resin of any of those examples. In consideration of heightened dimensional precision, heightened physical strength and higher suitability to ultrasonic welding, it is preferred to use high-impact polystyrene inclusive of 0.1–10 wt. % of synthetic rubber which has melt flow rate of 1.0–10.0 grams per 10 minutes, more preferably 2.0–8.0 grams per 10 minutes, and desirably 2.5–7 grams per 10 minutes. In view of avoiding deformation, Vicat softening temperature of the resin is 80° C. or higher under load of 15 kg, preferably 85° C. or higher, and desirably 90° C. or higher. Modulus in elasticity in flexure of the resin is 15,000–30,000 kg/cm$^2$, preferably 18,000–28,000 kg/cm$^2$, and desirably 20,000–28,000 kg/cm$^2$.

Carbon black is added to operate for shielding light. The carbon black is classified according to producing techniques as furnace carbon black, channel carbon black and thermal carbon black. Preferred carbon black is furnace carbon black having pH 5–9 and an average grain diameter of 10–80 m$\mu$, and particularly furnace carbon black having pH 6–8 and an average grain diameter of 15–50 m$\mu$, because of good light-shielding performance and little affect to image reproduction (fogging and/or increase or decrease in the photosensitivity of the photo film.

Representative examples of preferred carbon blacks on the market include Carbon Black #20(B), #30(B), #33(B), #40(B), #41(B), #44(B), #45(B), #50, #55, #100, #600, #2200(B), #2400(B), MA8, MA11 and MA100 (trade names), all produced by Mitsubishi Chemical Industries Ltd. Other examples of carbon blacks are Black Pearls 2, 46, 70, 71, 74, 80, 81 and 607, Regal 300, 330, 400, 660 and 991 and SRF-S, Sterling 10, SO, V, S, FT-FF and MT-FF (trade names), all produced by Cabot Corp.; and Uniteel R, BB, 15, 102, 3001, 3004, 3006, 3007, 3008, 3009, 3011, 3012, XC-3016, XC-3017 and 3020 (trade names), all produced by Ashland Chemical Co. However, the carbon black is by no means limited to these examples.

Furnace carbon black particle of less than 10 m$\mu$ diameter is unsuitable for kneading, so that light-shielding ability and physical strength is low. Above 100 m$\mu$, dispersing quality is higher, but light-shielding ability is inferior. Increasing density of carbon black to compensate light-shielding ability results in lowering physical strength and moldability so that the products are nearly useless in practice. Most carbon blacks beyond the range of pH 5–9 are not applicable because they are liable to adversely affect photographic properties.

To evade adverse influence on the photographic properties of the photographic film, free sulfur component included in the above-described carbon black should be 0.6% or less, preferably 0.3% or less, and more preferably 0.1% or less. Cyanogen compound included in the carbon black should be 0.01% or less, preferably 0.005% or less, and more preferably 0.001% or less. Aldehyde compound included in the carbon black should be 0.1% or less, preferably 0.05% or less, and more preferably 0.01% or less. It is necessary to consider that even a small amount of these matters have harmful effect on photographic properties.

Loading of the furnace carbon black is preferably 0.05 wt. % to 3.00 wt. %, in the interest of light-tightness, moldability and physical strength of the cassette shell. Loading of less than 0.05 wt. % would result in insufficient light-shielding ability. Loading of more than 3.00 wt. % would result in lowering physical strength of the cassette shell and increasing water absorption so much, that weld marks, silver streaking and other failure are liable to occur in injection molding, which would result in deterioration of appearance and surface strength.

As the light-shielding material, inorganic pigment such as titanium oxide, red oxide, calcium carbonate, etc. or organic pigment may be used in combination with the above-described carbon black.

To provide the cassette shell with a lubricant characteristic, lubricant can be mixed with resin molded into those parts, or can be applied to coat the parts. Examples of the lubricants are silicone oil; higher fatty acid amides, including oleic acid amide and erucic acid amide; metal salt of higher fatty acid, including zinc stearate; and ester, including fatty acid higher alcohol ester, and fatty acid polyvalent alcohol ester.

Examples of silicone oil that are usable with resin molded into the cassette shell are dimethyl polysiloxane and carboxyl-modified silicone lubricants disclosed in JP-A 62-284355 and 62-286043. Ratio of the silicone oil to be added can be in a range of 0.05–5.0 wt. %, preferably in a range of 1.0–3.0 wt. %.

Loading of less than 0.05 wt. % would have little smoothing effect. Loading of more than 5.0 wt. % would cause slipping between the resin and screws in an injection molding machine, thereby elongating molding cycles and also increasing the amount of silicone oil bleeding out to the product surface. The bled-out oil would be transferred to the photographic film contained in the cassette shell, and adversely would affect photographic properties of the photographic film, for example, would hinder developing agents from dispersing over the photographic film on photographic processing. In addition, weldability for ultrasonic sealing of the joints between the upper and lower shell halves would be lowered.

The viscosity of silicone oil is preferably 1,000–60,000 cS at 25° C. Viscosity of less than 1,000 cS at 25° C. would result in so large bleedout that has harmful effect on photographic properties. Silicone oil having a viscosity above 60,000 cS would be too difficult to knead into the resin to use in practice. Although there are various kinds of modified silicone oils, such as fluorine-modified silicone oil, on the market, most of them have harmful influence on photographic properties of the photographic film. They are found inapplicable to the cassette, for the reasons that they cannot provide sufficient smoothness to the resin, or cause remarkable thermal decomposition during the injection molding.

Preferred examples of commercially available resins for forming the cassette shell are K-RESIN #3350 (trade name, manufactured by Phillips Oil Co.), Denka Styrole PSM 991Y-14 (trade name, manufactured by Denki Kagaku Kogyo) and Mitsubishi Polytec YH 061-00802*1 (trade name, manufactured by Mitsubishi Chemical Industries Ltd.). K-RESIN #3350 is 0.95 $\mu$m in particle diameter and 19.35 Mw in weight-average molecular weight, and contains a rubber component of 7.2 wt. %, but does not contain carbon black and silicone oil. Denka Styrole PSM 991Y-14 is 1.48 $\mu$m in particle diameter and 20.4 Mw in weight-average molecular weight, and contains rubber component of 4.4–5.0 wt. %, carbon black of 0.5 wt. %, and silicone oil of 2.0 wt. %. Mitsubishi Polytec YH 061-00802*1 is 0.9 $\mu$m in particle diameter and 20.8 Mw in weight-average molecular weight, and contains rubber component of 5.7–6.4 wt. %, carbon black of 1.0 wt. %, and silicone oil of 2.0 wt. %.

It is preferable to add modifying agents of some kinds as required, to be hereinafter described. To prevent oxidative destruction of the resin and to prevent creation of breakdown products (alcohol, aldehyde, ketone, carboxylic acid, etc.) harmful to the performance of the photo film, antioxidant can be added preferably to the resin. Examples of antioxidants are as follows:

(a) Phenol-based antioxidants:

Vitamin E; vitamin E carboxylate ester; 6-tert-butyl-3-methylphenyl derivatives; 2,6-di-tert-butyl-p-cresol (BHT); 2,2'-methylenebis-(4-ethyl-6-tert-butylphenol); 4,4'-butylidenebis(6-tert-butyl-m-cresol); 4,4'-thiobis(6-tert-butyl-m-cresol); 4,4'-dihydroxydiphenylcyclohexane; alkylated bisphenol; styrenated phenol; 2,6-di-tert-butyl-4-methylphenol; n-octadecyl-3-(3',5'-di-tert-butyl-4'-hydroxyphenyl)propionate; 2,2'-methylenebis(4-methyl-6-tertbutylphenol); 4,4'-thiobis(3-methyl-6-tert-butylphenyl); 4,4'-butylidenebis(3-methyl-6-tert-butylphenol); stearyl-β-(3,5-di-tert-butyl-4-hydroxyphenyl)propionate; 1,1,3-tris(2-methyl-4-hydroxy-5-tert-butylphenyl)butane; 1,3,5-trimethyl-2,4,6-tris(3,5-di-tert-butyl-4-hydroxybenzyl)benzene; and tetrakis[methylene-3-(3',5'-di-tert-butyl-4'-hydroxyphenyl)propionate]methane.

(b) Ketone amine condensate-based antioxidants:

6-ethoxy-2,2,4-trimethyl-1,2-dihydroquinoline; polymers of 2,2,4-trimethyl-1,2-dihydroquinoline; and trimethyldihydroquinoline derivatives.

(c) Allylamine-based antioxidants:

Phenyl-α-naphthylamine; N-phenyl-β-naphthylamine; N-phenyl-N'-isopropyl-p-phenylenediamine; N,N'-diphenyl-p-phenylenediamine; N,N'-di-β-naphthyl-p-phenylenediamine; and N-(3'-hydroxybutylidene)-1-naphthylamine.

(d) Imidazole-based antioxidants:

2-mercaptobenzoimidazole; zinc salt of 2-mercaptobenzoimidazole; and 2-mercaptomethylbenzoimidazole.

(e) Phosphite-based antioxidants:

Alkylated allylphosphite; diphenylisodecylphosphite; sodium tris(nonylphenyl) phosphite; tris(nonylphenyl) phosphite; and triphenyl phosphite.

(f) Thiourea-based antioxidants:

Thiourea derivatives; and 1,3-bis(dimethylaminopropyl)-2-thiourea.

(g) Other antioxidants useful for air oxidation:

Dilauryl thiodipropionate.

(h) Hindered phenol-based antioxidants:

1,3,5-trimethyl-2,4,6-tris(3,5-di-tert-butyl-4-hydroxybenzyl)benzene;

tetrakis[methylene(3,5-di-tert-butyl-4-hydroxy-hydrocinnamate)]methane;

octadecyl-3,5-di-tert-butyl-4-hydroxy-hydrocinnamate;

2,2',2'-tris[(3,5-di-tert-butyl-4-hydroxyphenyl)propionyloxy]ethylisocyanurate;

tetrakis(2,4-di-tert-butyl-phenyl)-4,4'-biphenylene diphosphite;

4,4'-thiobis(6-tert-butyl-o-cresol);

2,2'-thiobis(6-tert-butyl-4-methylphenol);

tris(2-methyl-4-hydroxy-5-tert-butylphenyl)butane;

2,2'-methylenebis(4-methyl-6-tert-butylphenol);

4,4'-methylenebis(2,6-di-tert-butylphenol);

4,4'-butylidenebis(3-methyl-6-tert-butylphenol);

2,6-di-tert-butyl-4-methylphenol;

4-hydroxymethyl-2,6-di-tert-butylphenol;

2,6-di-tert-4-n-butylphenol;

2,6-bis(2'-hydroxy-3'-tert-butyl-3'-methylbenzyl)-4-methylphenol;

4,4'-methylenebis(6-tert-butyl-o-cresol); and 4,4'-butylidene-bis(6-tert-butyl-m-cresol).

Among these, particularly preferred antioxidants have a melting point of 100° C. or higher, and more preferably 120° C. or higher, because of small amounts of bleedout and thermal decomposition and little influence to image reproduction of the photo film.

Representative examples of commercially available antioxidants are described below.

(1) Phenol-based antioxidants:

SUMILIZER BHT (trade name, manufactured by Sumitomo Chemical), IRGANOX 1076 (trade name, manufactured by Ciba Geigy), MARK AO-50 (trade name, manufactured by Adeca Argus), SUMILIZER BP-76 (trade name, manufactured by Sumitomo Chemical), TOMINOX SS (trade name, manufactured by Yoshitomi), IRGANOX 565 (trade name, manufactured by Ciba Geigy), IONOX WSP (trade name, manufactured by ICI), SANTONOX (trade name, manufactured by Monsanto), SUMILIZER WX R (trade name, manufactured by Sumitomo Chemical), ANTAGECRYSTAL (trade name, manufactured by Kawaguchi), IRGANOX 1035 (trade name, manufactured by Ciba Geigy), ANTAGE W-400 (trade name, manufactured by Kawaguchi), NOCLIZER NS-6 (trade name, manufactured by Ohuchi Shinko), IRGANOX 1425 WL (trade name, manufactured by Ciba Geigy), MARK AO-80 (trade name, manufactured by Adeca Argus), SUMILIZER GA-80 (trade name, manufactured by Sumitomo Chemical), TOPANOL CA (trade name, manufactured by ICI), MARK AO-30 (trade name, manufactured by Adeca Argus), MARK AO-20 (trade name, manufactured by Adeca Argus), IRGANOX 3114 (trade name, manufactured by Ciba Geigy), MARK AO-330 (trade name, manufactured by Adeca Argus), IRGANOX 1330 (trade name, manufactured by Ciba Geigy), CYANOX 1790 (trade name, manufactured by ACC), IRGANOX 1010 (trade name, manufactured by Ciba Geigy), MARK AO-60 (trade name, manufactured by Adeca Argus), SUMILIZER BP-101 (trade name, manufactured by Sumitomo Chemical), and TOMINOX TT (trade name, manufactured by Yoshitomi).

(2) Phosphorus-based antioxidants:

IRGAFOS 168 (trade name, manufactured by Ciba Geigy), MARK 2112 (trade name, manufactured by Adeca Argus), WESTON 618 (trade name, manufactured by Vorg-Warner), MARK PEP-8 (trade name, manufactured by Adeca Argus), ULTRANOX 626 (trade name, manufactured by Vorg-Warner), MARK PEP-24G (trade name, manufactured by Adeca Argus), MARK PEP-36 (trade name, manufactured by Adeca Argus), and HGA (trade name, manufactured by Sanko).

(3) Thioether-based antioxidants:

DLTDP "YOSHITOMI" (trade name, manufactured by Yoshitomi), SUMILIZER TPL (trade name, manufactured by Sumitomo Chemical), ANTIOX L (trade name, manufactured by Nippon Oil), DMTD "YOSHITOMI" (trade name, manufactured by Yoshitomi), SUMILIZER TPT (trade name, manufactured by Sumitomo Chemical), ANTIOX M (trade name, manufactured by Nippon Oil), DSTP "YOSHITOMI" (trade name, manufactured by Yoshitomi), SUMILIZER TPS (trade name, manufactured by Sumitomo Chemical), ANTIOX S (trade name, manufactured by Nippon Oil), SEENOX 412S (trade name, manufactured by Sipro), MARK AO-412S (trade name, manufactured by Adeca Argus), SUMILIZER TP-D (trade name, manufactured by Sumitomo Chemical), MARK AO-23 (trade name, manufactured by Adeca Argus), SANDSTAB P-EPQ (trade name, manufactured by Sand), IRGAFOS P-BPQ FF (trade name, manufactured by Ciba Geigy), IRGANOX 1222 (trade name, manufactured by Ciba Geigy), MARK 329K (trade name, manufactured by Adeca Argus), WESTON 399 (trade name, manufactured by Vorg-Warner), MARK 260 (trade name, manufactured by Adeca Argus), and MARK 522A (trade name, manufactured by Adeca Argus).

(4) Metal Deactivator

NAUGARD XL-1 (trade name, manufactured by Uniroyal), MARK CDA-1 (trade name, manufactured by Adeca Argus), MARK CDA-6 (trade name, manufactured by Adeca Argus), IRGANOX MD1024 (trade name, manufactured by Ciba Geigy), and CUNOX (trade name, manufactured by Mitsui Toatsu).

Preferred antioxidants are the phenol-based ones, and particularly the hindered phenol-based ones. Commercially available preferred antioxidants include IRGANOX series products of Ciba Geigy, SUMILIZER BHT, SUMILIZER BH-76, SUMILIZER WX-R and SUMILIZER BP-101 of Sumitomo Chemical Co., Ltd.

It is effective to use one or more, particularly two or more of 2,6-di-tert-butyl-p-cresol (BHT), a low-volatile and high molecular weight hindered phenol-based antioxidant (e.g., IRGANOX 1010, IRGANOX 1076, TOPANOL CA, IONOX 330, all trade names), dilauryl thiodipropionate, distearylthiopropionate and dialkyl phosphate in combination. Since antioxidant is a reducing agent which adversely affects photographic materials, it is necessary to carefully examine its kind and the compounding amount so that its preventing effect against thermal decomposition may be well-balanced in consistency with the photographic properties. In view of this, it is preferable to use phosphorus-based and phenol-based antioxidants, and more preferably hindered phenol-based antioxidants, because these have not much unfavorable influence on the photographic film, such as fogging and disordering of photosensitivity. Among the hindered phenol-based antioxidants, preferred ones have a melting point of 100° C. or higher, and particularly 120° C. or higher. It is most preferable to use two or more of the above-described phenol-based and phosphorus-based antioxidants in combination.

In particular, the antioxidant action is synergistically activated by light-shielding agents such as carbon black. It is preferable to use the above-described phenol-based and phosphorus-based antioxidants in combination with carbon black in view of the high effect of antioxidant action.

In addition, it is possible to select antioxidants disclosed in:

*Plastic Data Handbook,* published by Kogyo Chosakai Publishing Co., Ltd., Tokyo, pp. 794–799;

*Plastic Additives Data,* issued by K.K. Kagaku Kogyo Sha, pp. 327–329; and

*Plastics Age Encyclopedia, Advanced Version* (1986), issued by K.K. Plastic Age, pp. 211–212.

The following description relates to how to evade harmful influence of the above-described antioxidants on photographic films. In general, oxidative destruction of thermoplastic resin is the higher according to the number of ramifications of $CH_3$ in the resin. This is because the more oxygen is absorbed in the resin.

It is assumed that hydrocarbon is automatically oxidized once a free radical is generated by dehydration in the presence of oxygen, according to chain reaction of the following formulas:

$$RH \rightarrow R \qquad (1)$$

$$R. + O_2 \rightarrow RH \rightarrow ROO. \qquad (2)$$

$$ROO. + RH \rightarrow ROOH + Re. \qquad (3)$$

$$ROOH \rightarrow RO. + .OH \qquad (4)$$

$$RO. + RH \rightarrow ROH + R. \qquad (5)$$

$$.OH + RH \rightarrow HOH + R. \qquad (6)$$

Thus, the oxidation of hydrocarbon is accelerated to produce a great quantity of alcohols, aldehydes, acids and the like, and they react with each other to produce polymer.

In order to prevent oxidation of hydrocarbon, it is necessary to intercept the above chain reaction. Antioxidant is used for this purpose. In alternative, it is preferable to load radial scavenger as set forth below.

Examples of the radical scavenger include 1,1-diphenyl-2-picrylhydrazyl, 1,3,5-triphenylferdazyl, 2,2,6,6-tetramethyl-4-piperidone-1-oxyl, N-(3-N-oxyanilino-1,3-dimethylbutylidene)-aniline oxide, a high valency metal salt such as ferric chloride, diphenylpicrylhydrazine, diphenylamine, hydroquinone, tert-butyl catechol, dithiobenzoyldisulfide, p,p'-ditolyltrisulfide, benzoquinone derivative, nitro compound and nitroso compound. Among these, hydroquinone is preferred the most. The above-described radical scavengers may be used either alone or in combination of several kinds. Compounding amount of radical scavenger may be 1,000–10,000 ppm.

As the antioxidant, there are radical chain terminator and peroxide decomposer. The former reacts with free radical groups, mainly ROO., which are chain carriers, to inactivate them. The latter decomposes hydroperoxide ROOH which is the main source of free radical groups, to stabilize it.

The radical chain terminator includes alkylphenol antioxidant and aromatic amine antioxidant. The peroxide decomposer includes sulfur-containing antioxidant and phosphorus-containing antioxidant.

Antioxidant is reducer adversely affecting photographic film. Should its kind and the compounding amount be unsuitable, degradation of photographic film would occur.

Examples of the antistatic agent preferably loaded in the opaque thermoplastic resin for use in the invention are described below.

I. Nonionic (1) Alkylamine derivatives T-B103 (trade name, manufactured by Matsumoto Yushi), and T-B104 (trade name, manufactured by Matsumoto Yushi); Alkylamide types: Polyoxiyethylene alkylamine: Armostat 310 (trade name, manufactured by Lion Fat & Oil), Tertiary amine (laurylamine): Armostat 400 (trade name, manufactured by Lion Fat & Oil), N,N-bis(2-hydroxyethylcocoamine): Armostat 410 (trade name, manufactured by Lion Fat & Oil), Tertiary amine: ANTISTATIC 273C, 273 and 273E (trade name, manufactured by Fine Org. Chem.), N-hydroxyhexadecyl-di-ethanol-amine: Belgian Patent No. 654,049, and N-hydroxyoctadecyl-di-ethanol-amine: National Dist.

(2) Fatty acid amide derivatives TB-115 (trade name, manufactured by Matsumoto Yushi), Elegan P100 (trade name, manufactured by Nippon Oils & Fats), and Erik SM-2 (trade name, manufactured by Yoshimura Yukagaku); Hydroxystearic amide, Oxalic-N,N'-distearylamidebutylester (manufactured by Hoechst), and Polyoxyethylenealkylamide.

(3) Ether types Polyoxyethylenealkylether $RO(CH_2CH_2O)_nH$, and Polyoxyethylenealkylphenyl ether;

Special nonionic types: Resistat 104, PE100, 116–118, PE 132 and 139 (trade names, manufactured by Dai-ichi Kogyo Seiyaku), Elegan E115, Chemistat 1005 (trade names, manufactured by Nippon Oils & Fats), Erik BM-1 (trade name, manufactured by Yoshimura Yukagaku), and Electrostripper TS, TS 2, 3, 5, EA, EA2 and 3 (trade name, manufactured by Kao Soap).

(4) Polyhydric alcohol ester types Glycerine fatty acid ester: mono-, di- or triglyceride of stearic acid or hydroxystearic acid, monoglyceride (manufactured by Nippon Shono), TB-123 (trade name, manufactured by Matsumoto Yushi), and Resistat 113 (trade name, manufactured by Dai-ichi Kogyo Seiyaku). Sorbitan fatty acid ester; Special ester: Erik BS-1 (trade name, manufactured by Yoshimura Yukagaku), 1-Hydroxyethyl-2-dodecylglyoxazoline (manufactured by British Cellophane).

II. Anionic (1) Sulfonic acids Alkylsulfonate, $RSO_3Na$, Alkylbenzenesulfonate, Alkylsulfate, and $ROSO_3Na$.

(2) Phosphoric ester type Alkyl phosphate.

III. Cationic (1) Amide type cation Resistat PE300, 401, 402, 406 and 411 (trade name, manufactured by Dai-ichi Kogyo Seiyaku).

(2) Quaternary ammonium salts Quaternary ammonium chloride, Quaternary ammonium sulfate, and Quaternary ammonium nitrate; Catimin CSM-9 (trade name, manufactured by Yoshimura Yukagaku), CATANAC 609 (trade name, manufactured by American Cyanamide), Denon 314C (trade name, manufactured by Marubishi Yuka), Armostat 300 (trade name, manufactured by Lion Fat & Oil), 100V (trade name, manufactured by ARMOR), Electrostripper ES (trade name, manufactured by Kao Soap), and Chemistat 2009A (trade name, manufactured by Nippon Oils & Fats); Stearamido propyl-dimethyl-β-hydroxyethyl ammonium nitrate: CATANAC-SN (trade name, manufactured by American Cyanamide).

IV. Ampho-ionic (1) Alkylbetaine type (2) Imidazoline types Leostat 53 and 532 (trade name, manufactured by Lion Fat & Oil), AMS 53, 303 and 313 (trade name, manufactured by Lion Fat & Oil); Alkylimidazoline type.

(3) Metal salt types AMS 576 (trade name, manufactured by Lion Fat & Oil) Leostat 826 and 923 (trade name, manufactured by Lion Fat & Oil) $(RNR'CH_2CH_2CH_2NCH_2COO)_2Mg$ (manufactured by Lion Fat & Oil) wherein $R \geqq C$, $R'$=H or $(CH_2)_m COO$—, $R=C_{3-N}$ hydrocarbon, A=oxygen or an imino group, and M=organic amine or a metal.

(4) Alkyl alanine type

V. Electroconductive Resin

Polyvinylbenzyl type cation, and Polyacrylic acid type cation.

VI. Others

Resistat 204 and 205 (trade name, manufactured by Dai-ichi Kogyo Seiyaku), Elegan 2E and 100E (trade name, manufactured by Nippon Oils & Fats), Chemistat 1002, 1003 and 2010 (trade name, manufactured by Nippon Oils & Fats), Erik 51 (trade name, manufactured by Yoshimura Yukagaku), and ALROMINE RV-100 (trade name, manufactured by Geigy).

Among the above-described antistatic agents, the non-ionic antistatic agent is particularly preferred due to small harmful influence on photographic properties and human body.

The total addition amount of two or more antistatic agents is preferably 0.001–5.0 wt. %, and more preferably 0.005–3.0 wt. %. If the addition amount should be less than 0.001 wt. %, the addition effect of antioxidant action and smoothness is not satisfactory and only cost for kneading increase. On the other hand, if the addition amount should exceed 5.0 wt. %, slipping between the melted resin and the screw of the molding machine is readily caused and the ejection amount of resin becomes unstable. Further, blocking or bleeding out is liable to occur by aging after molding. Thickness of a layer is likely to have deviation.

It is possible in the present invention to add various additives as required to the resin. Examples of the additives are as follows.

1) Plasticizer: phthalate ester, glycol ester, fatty acid ester, and phosphate ester.

2) Stabilizer: lead type, cadmium type, zinc type, alkali earth metal type, and organo-tin type.

3) Flame retardant: phosphate ester, halogenated phosphate ester, halide, inorganic matters, and phosphorus-containing polyol.

4) Filler: alumina, kaolin, clay, calcium carbonate, mica, talc, titanium oxide, and silica.

5) Reinforcer: glass roving, metal fiber, glass fiber, milled glass fiber, and carbon fiber.

6) Foaming agent: inorganic foaming agents (ammonium carbonate and sodium bicarbonate), and organic foaming agents (nitroso type and azo type).

7) Vulcanizer: vulcanizing accelerator, and supplement accelerator.

8) Deterioration inhibitor: ultraviolet light absorber, metal inactivation agent, and peroxide decomposer.

9) Coupling agent: silane type, titanate type, chrome type, and aluminum type.

10) Various thermoplastic resins, thermoplastic elastomer, and rubber.

Figure 18A:
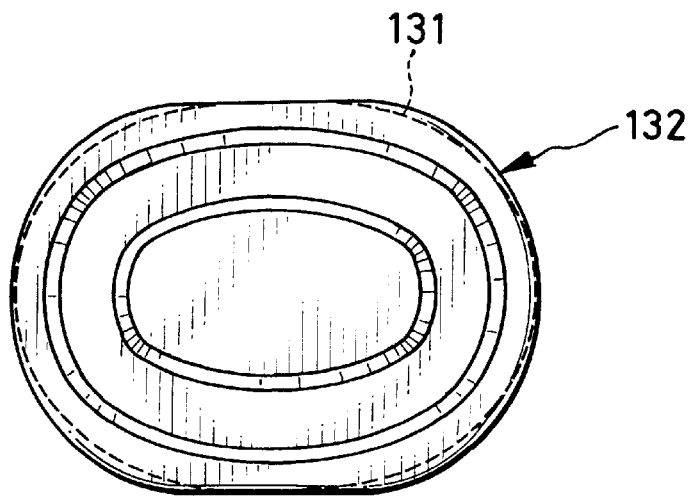
FIG. 18A is a plan illustrating a cassette containing case.
Figure 18B:
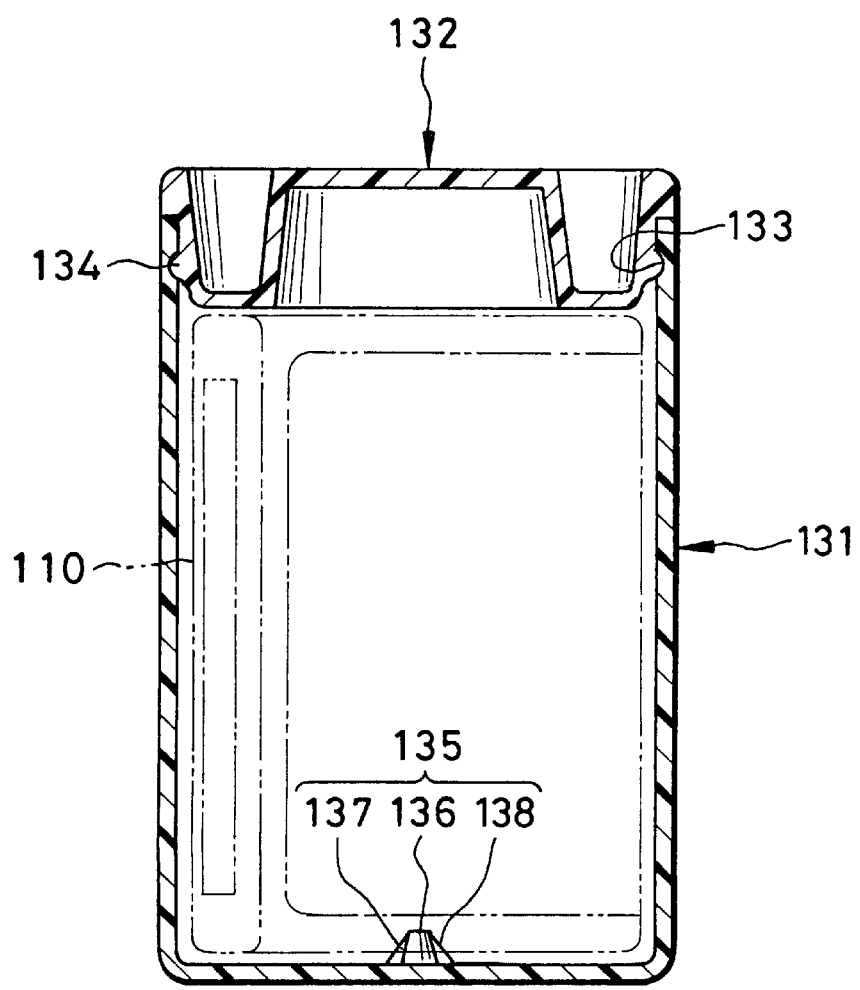
FIG. 18B is a vertical section illustrating the cassette containing case.
Figure 20:
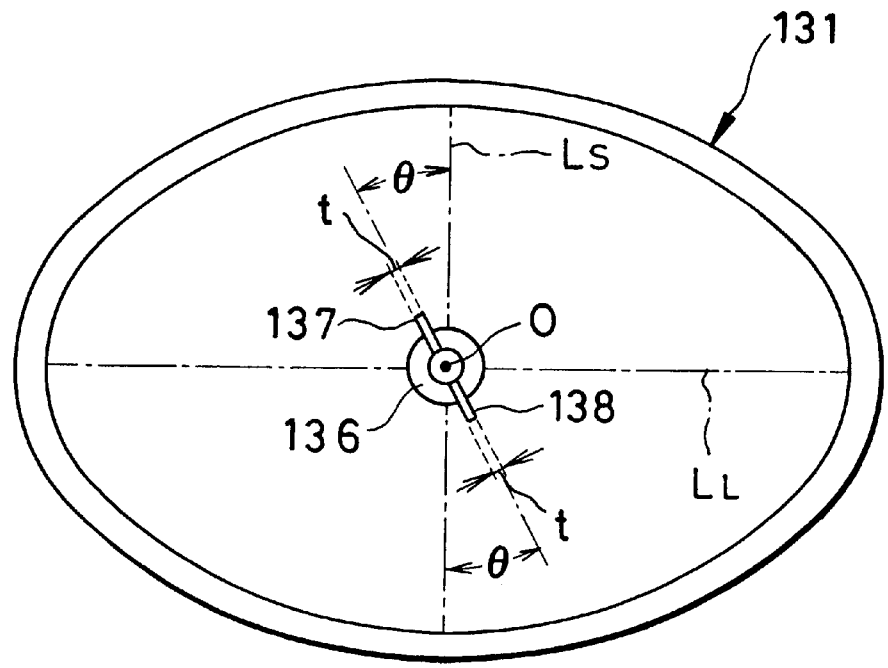
FIG. 20 is a plan illustrating a case body including the spool retainer portion.
Figure 21:
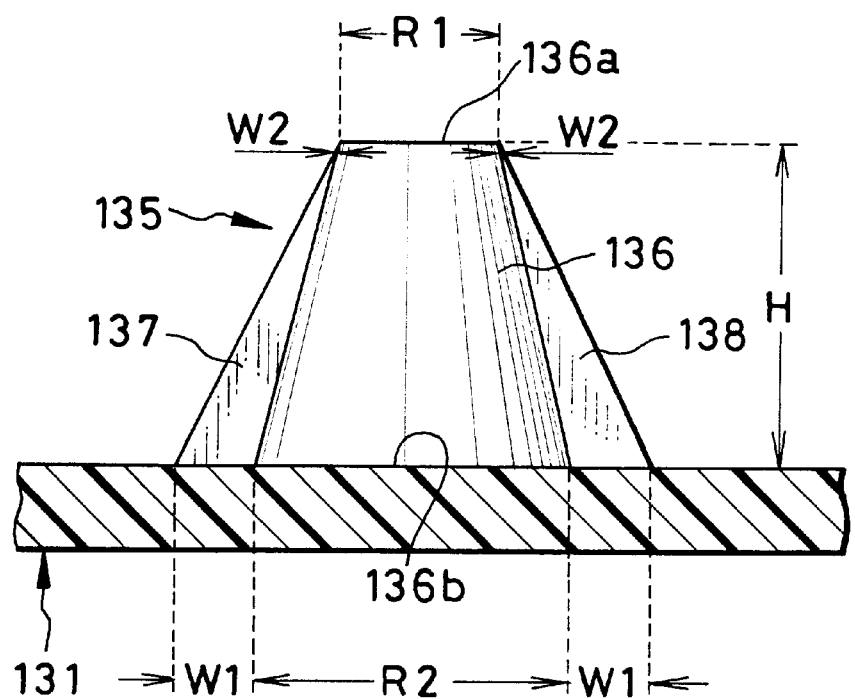
FIG. 21 is a front elevation, partially in section, illustrating the spool retainer portion.
Figure 20A:
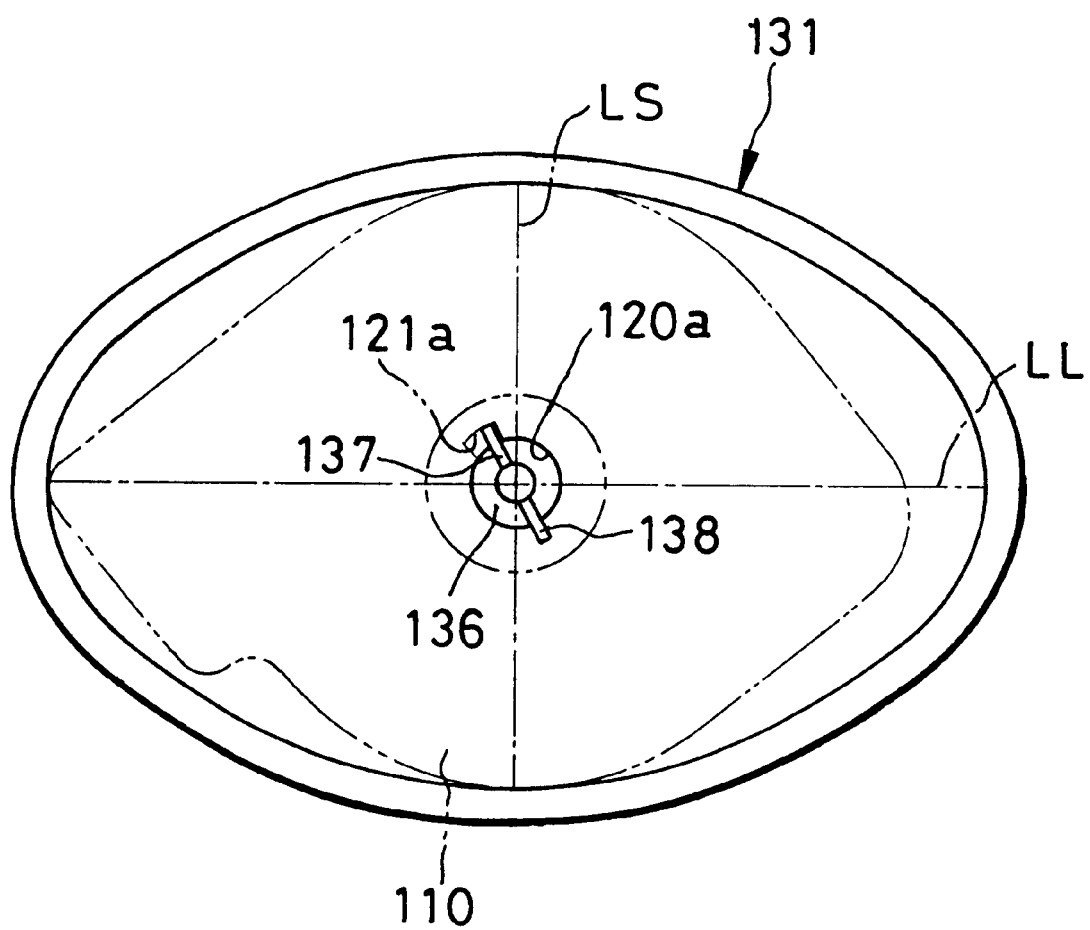
FIG. 20A is a plan illustrating the case body and its relationship with a photo film cassette.
Figure 22:
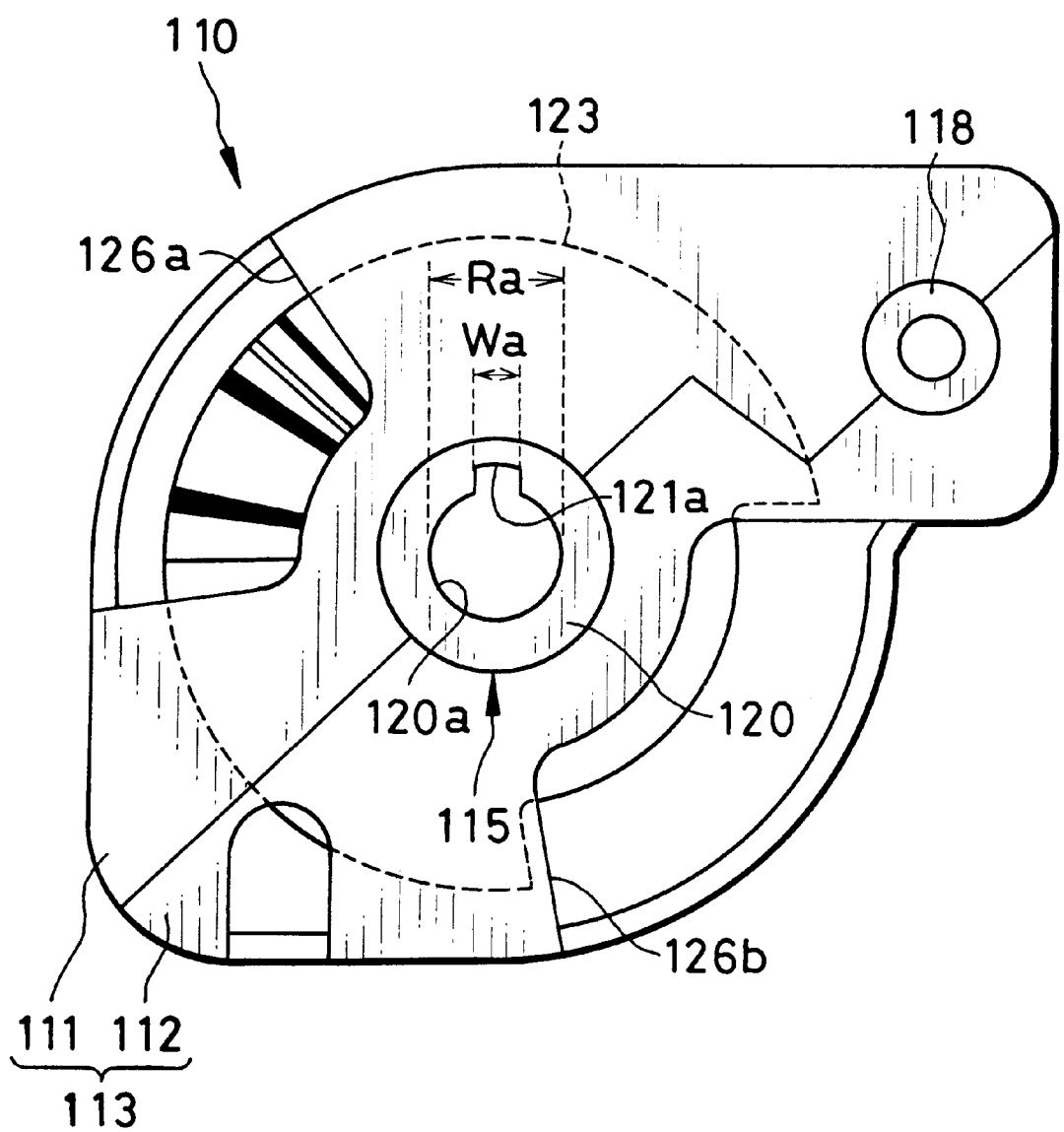
FIG. 22 is a side elevation illustrating the photo film cassette.
Figure 23:
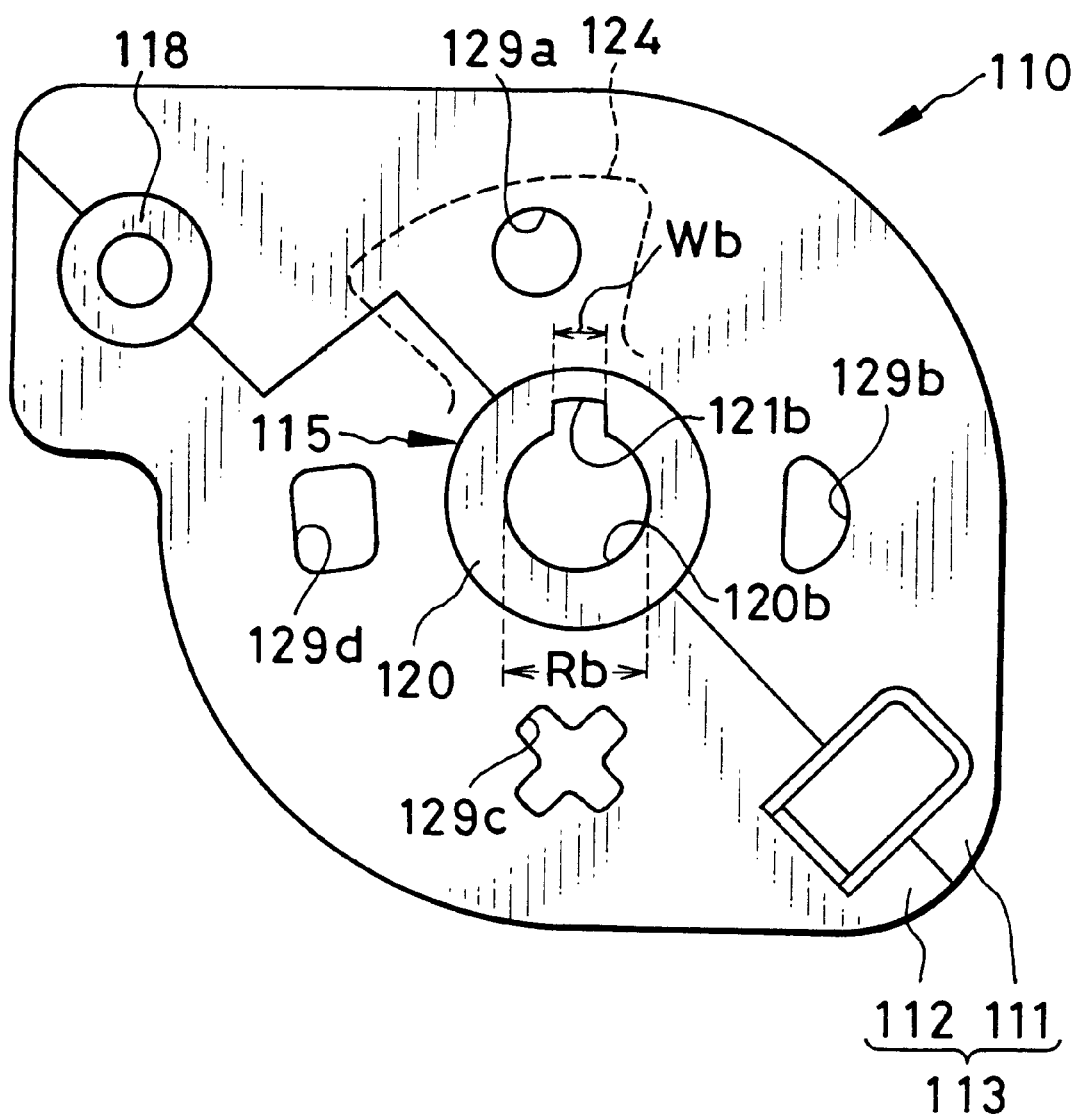
FIG. 23 is a side elevation illustrating the photo film cassette at an end opposite to that of FIG. 22.
Figure 24A:
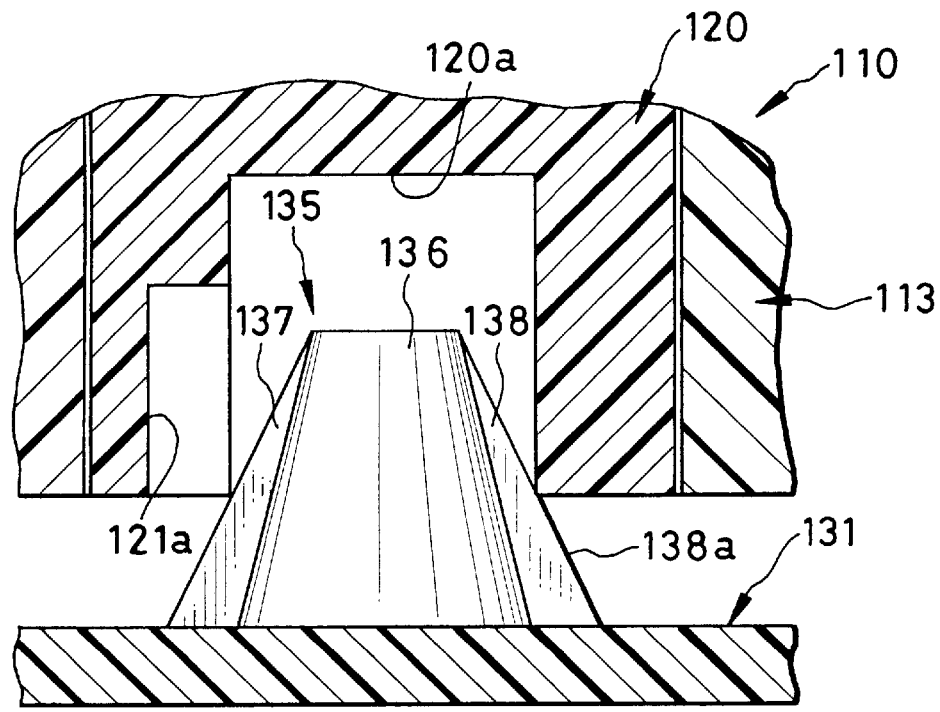
FIG. 24A is an explanatory view in section, illustrating a state where an axial hole of a cassette spool is about cover the spool retainer portion.
Figure 24B:
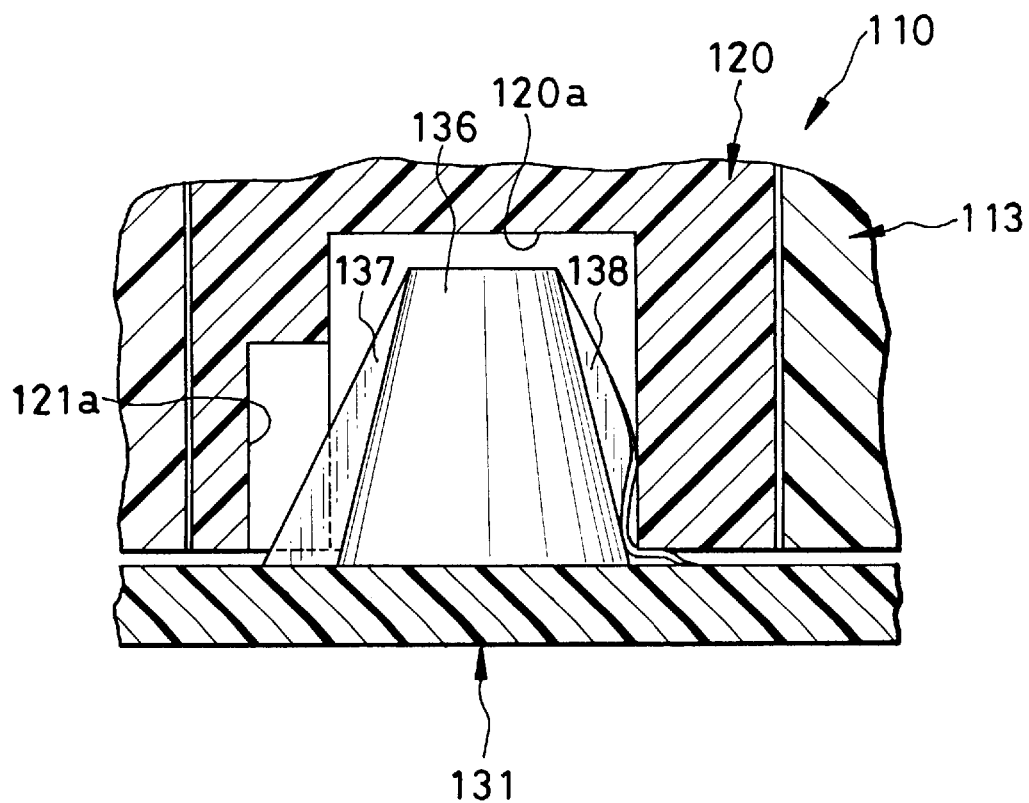
FIG. 24B is an explanatory view in section, illustrating a state where the axial hole covers the spool retainer portion in engagement of a lock projection.

Referring now to FIGS. 18A–28, an embodiment is described now, in which a photo film cassette 110 similar to the above embodiment is contained in a cassette containing case 130. In FIGS. 18A and 18B, the cassette containing case 130 is constituted by a case body 131 and a cap 132 fitted on it to close it. The case body 131 includes a first end wall and a peripheral wall, namely a tube with a bottom. The cap 132 operates as a second end wall of the cassette containing case 130. Each of the case body 131 and the cap 132 is a single piece formed of resin. When the photo film cassette 110 is contained in the case body 131, the cap 132 is fitted on an open end of the case body 131. There is a groove 133 formed in a peripheral edge of the case body 131. A ridge 134 is formed on the whole circumference of the inside of the lateral wall of the cap 132. When the cap 132 is fitted on the case body 131, the ridge 134 is fitted in the groove 133 to tighten the closing of the cap 132 for the case body 131. In FIGS. 1, 22 and 23, an end face of the photo film cassette 110 where an axial hole 120a is located is set on the bottom he case body 131. Another end face of the photo film cassette 110 where indicator openings 129a–129d for an indicator plate 124 are located is set upwards at the open end of the case body 131.

Figure 19:
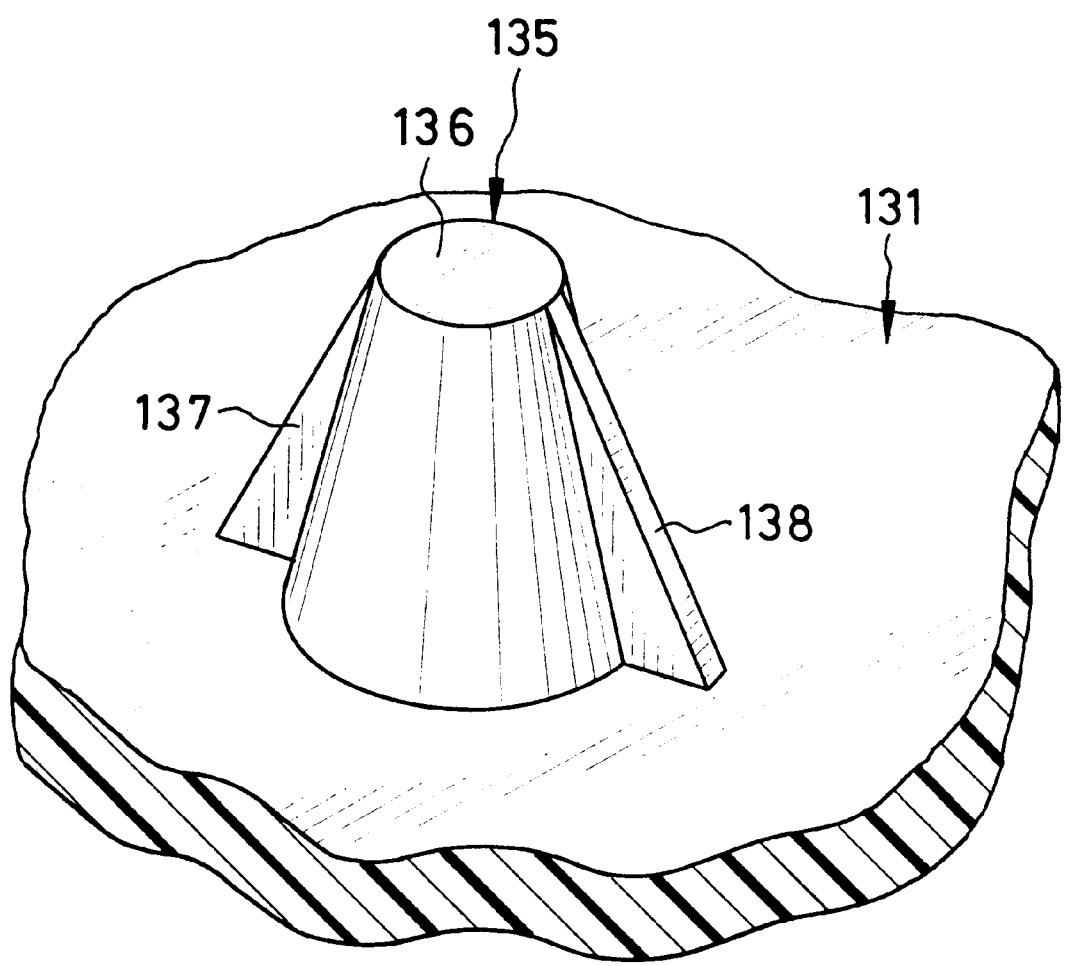
FIG. 19 is a perspective illustrating a spool retainer portion of the cassette containing case.

On the bottom of the case body 131, a spool retainer portion 135 is formed integrally therewith. In FIG. 19, the spool retainer portion 135 includes a positioning projection 136 of a conical frustum shape and a pair of lock projections 137 and 138, which are protruded from the bottom of the case body 131 vertically upwards and also from the peripheral face of the positioning projection 136 radially. The lock projections 137 and 138 have a thin plate shape.

In FIG. 20, the case body 131 is formed in an elliptical shape as viewed in the horizontal section. The spool retainer portion 135 is disposed at a point of intersection of a longer axis LL and a shorter axis LS. The lock projections 137 and 138 are formed in symmetrical positions with reference to a center O of the positioning projection 136. The lock projections 137 and 138 are so disposed that, when the photo film cassette 110 having the indicator plate 124 stopped in an unexposed status position is contained in the case body 131, either one of the lock projections 137 and 138 is engaged with a key way 121a of the photo film cassette 110. Let θ be an angle of the lock projections 137 and 138 with reference to the shorter axis of the case body 131. Let t be a thickness of the lock projections 137 and 138. In the present embodiment, the lock projections 137 and 138 are formed with the angle θ in a range of 20–30°, and the thickness t in a range of 0.10–0.20 mm.

In FIG. 21, let H be a height of the positioning projection 136. Let R1 be a diameter of an upper base surface 136a of the positioning projection 136. Let R2 be a diameter of a lower base surface 136b of the positioning projection 136. The positioning projection 136 is formed with H=4.0 mm, R1=1.9 mm and R2=3.8 mm. The lock projections 137 and 138 are formed to decrease the width from their bottom upwards to their top which is flush with the top of the lower base surface 136b of the positioning projection 136. Let W1 be a width of the bottom of the lock projections 137 and 138. Let W2 be a width of the top of the lock projections 137 and 138. The lock projections 137 and 138 are formed with W1 in a range of 0.7–1.0 mm, and W2=0.0 mm.

Note that both axial ends of the spool are depicted in FIGS. 22 and 23. The axial hole 120a of a spool core 120 has the key way 121a cut in a radial direction. Another axial hole 120b of the spool core 120 has a key way 121b cut in a radial direction. A drive shaft of a camera is engaged with the key way 121a or 121b, and is driven to cause a spool 115 to rotate. Let Ra be a diameter of the axial hole 120a. Let Rb be a diameter of the axial hole 120b. Let Wa be a width of the key way 121a. Let Wb be a width of the key way 121b. The axial holes 120a and 120b and the key ways 121a and 121b are formed as Ra=4.0 mm, Rb=3.5 mm, and Wa=Wb=1.3 mm.

Note that reference numerals 111 and 112 designate shell halves, 113 a cassette shell, 123 a data disk, and 126a and 126b bar code windows.

The operation of the cassette containing case 130 is described now. When the photo film cassette 110 is inserted into the case body 131, the spool retainer portion 135 is fitted in the axial hole 120a in the end of the photo film cassette 110. The photo film cassette 110 is positioned within the case body 131. The positioning projection 136 has the shape of a frustum of a cone. The lock projections 137 and 138 are formed to decrease the width from their bottom upwards to their top, so that a tip of the spool retainer portion 135 has a small diameter. The spool retainer portion 135 can be easily entered into the axial hole 120a.

The case body 131 has the rotationally symmetrical shape. The photo film cassette 110 can be inserted into the case body 131 in a manner irrespective of a difference of 180 degrees in rotational orientation of the photo film cassette 110. The lock projections 137 and 138 are disposed in a rotationally symmetrical manner from each other with respect to the center O of the positioning projection 136. When the photo film cassette 110 is inserted in the case body 131 with the indicator plate 124 stopped in the unexposed status position, either one of the lock projections 137 and 138 is confronted with the key way 121a. The other of the lock projections 137 and 138 is confronted with a flat surface of the outside of the photo film cassette 110. Let the lock projection 137 be confronted with the key way 121a in FIG. 24A. An edge of an opening of the axial hole 120a contacts an inclined surface 138a of the lock projection 138, to locate the photo film cassette 110 on the spool retainer portion 135 in a state slightly distant from the bottom of the case body 131.

When the cap 132 is mounted on the open end of the case body 131, the inside face of the cap 132 pushes the photo film cassette 110 toward the bottom of the case body 131. Accordingly the lock projection 138 is deformed or collapsed and partially fitted in the axial hole 120a together with the positioning projection 136. The whole of the lock projection 137 including its bottom end is received in the key way 121a. See FIG. 24B. The lock projection 138 has a sufficiently small thickness, and thus can be deformed or collapsed without remarkably great pushing force. The cap 132 can be fitted unfailingly.

The photo film cassette 110 contained in the cassette containing case 130 is respectively packaged in an individual small box. 20 photo film cassettes being packaged are externally packaged in a corrugated cardboard box, and shipped out for retail sale. As the positioning projection 136 on the bottom of the case body 131 is received in the axial hole 120a, the photo film cassette 110 is kept positioned in the case body 131 and prevented from being moved lightly. The lock projection 137 being engaged with the key way 121a, the spool 115 is kept from rotating. The indicator plate 124 in the unexposed status position is kept from changed even when shocked to a considerable extent during transportation.

Note that, if the lock projection 138 is confronted with the key way 121a in the insertion of the photo film cassette 110 into the case body 131, then the lock projection 137 is deformed or collapsed by the photo film cassette 110 upon mounting the cap 132 on the case body 131. The lock projection 138 is received in the key way 121a to regulate rotation of the spool 115.

After the photo film cassette 110 is removed from the cassette containing case 130 and used by a user, the indicator plate 124 is moved to a position other than the unexposed status position. When the photo film cassette 110 is inserted in the case body 131, the key way 121a is not confronted with either of the lock projections 137 and 138. However the lock projections 137 and 138 have the small thickness. When the cap 132 is fitted on the case body 131 after the insertion of the photo film cassette 110, the lock projections 137 and 138 are easily deformed or collapsed by the outside of the photo film cassette 110, without giving the user difficulties in handling the cassette containing case 130.

Figure 25:
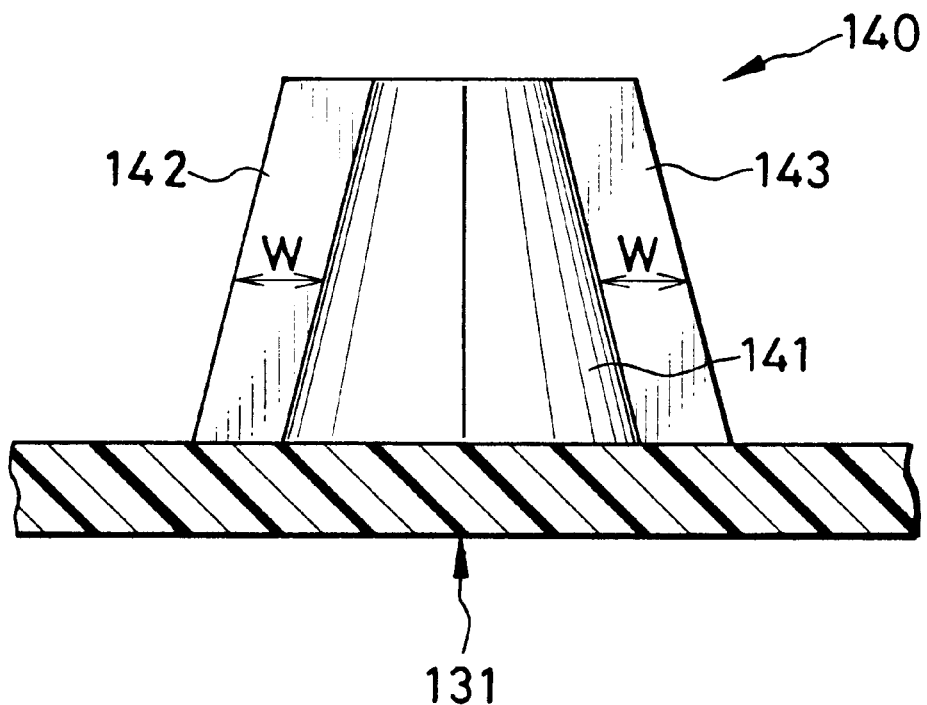
FIG. 25 is a side elevation, partially in section, illustrating another preferred spool retainer portion having a quadrangular lock projection.
Figure 26:
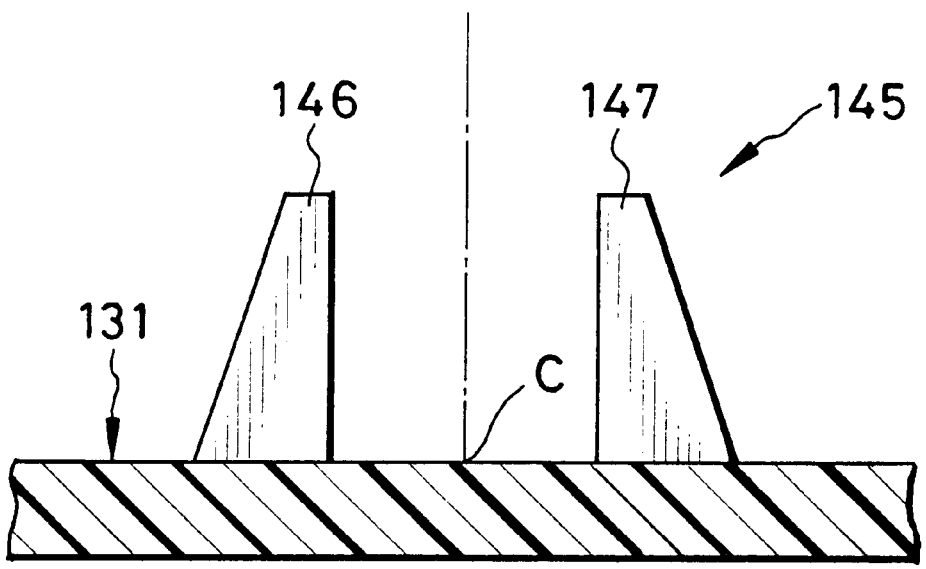
FIG. 26 is a side elevation, partially in section, illustrating still another preferred spool retainer portion without a central positioning projection.

In the above embodiment, the lock projections 137 and 138 are formed to decrease the width from their bottom upwards to their top. Alternatively lock projections 142 and 143 can be formed on a positioning projection 141 of a spool retainer portion 140 as depicted in FIG. 25, to have a constant width W from their bottom to their top. Furthermore a spool retainer portion 145 does not require a central positioning projection as depicted in FIG. 26. The spool retainer portion 145 is constituted by lock projections 146 and 147 on the bottom of the case body 131. The lock projections 146 and 147 are symmetrical with respect to the center C of the case body 131.

In the above embodiment, the photo film cassette 110 is containable in the case body 131 when the photo film cassette 110 is oriented in the predetermined direction and also when the photo film cassette 110 is oriented in a direction rotationally away from the predetermined direction by 180 degrees. Alternatively only one lock projection may be used while eliminating the other. With this structure, orientation of the photo film cassette 110 with reference to the case body 131 should be uniquely determined in one predetermined direction.

In the above embodiment, the lock projections 137, 138, 142, 143, 146 and 147 are formed on the bottom of the case body 131. Alternatively the spool retainer portion 135, 140, 145 may be formed on the inside face of the cap 132 for the purpose of regulating rotation of the spool 115 by engagement of one lock projection in either of the key ways 121a and 121b outside the photo film cassette 110. Of course both the cap 132 and the bottom of the case body 131 may respectively have the spool retainer portion 135, 140, 145. Furthermore the positioning projection 136, 141 may have a shape of a cone, a polygonal pyramid, or a frustum of a polygonal pyramid, or have a shape of a rod or a polygonal prism of which a tip is tapered in any manner.

The photo film cassette 110 may be contained in the case body 131 in such a manner as to position the spool 115 eccentrically with respect thereto. For the photo film cassette 110 of the type, the lock projections 137, 138, 142, 143, 146 and 147 may be arranged in positions along the longer axis LL but away from one another beside the center O of the case bottom.

In the above embodiments, the lock projections 137, 138, 142, 143, 146 and 147 have the plate shape. Alternatively lock projections may be shaped in a pin shape or any other protruded shape with flexibility.

EXAMPLE

Six samples A–F of the cassette containing case 130 were experimentally produced in which the width W1 of the bottom of the lock projections 137 and 138 was changed. Moldability and resistance to impact were tested for each of the samples. In samples A–F, the spool retainer portion 135 according to FIG. 19 was formed on the bottom of the case body 131. The thickness t of the lock projections 137 and 138 was determined 0.25 mm. 200 cassettes were produced for each of samples A–F.

To evaluate resistance to impact, experiments were conducted in dropping the photo film cassette 110 contained in each sample case. Then the indicator plate 124 in the photo film cassette 110 was checked for any changes in its rotational position. The dropping tests were conducted according to a method of JIS-Z-0202. In a form similar to the photo film cassette 110 shipped for retail sale, the indicator plate 124 was stopped in the unexposed status position, with which the photo film cassette 110 was contained in each sample, and additionally packaged in an individual small box. 20 photo film cassettes thus packaged were externally packaged in a corrugated cardboard box, and then subjected to the dropping tests. To check the stop position of the indicator plate 124, 50 samples were picked up randomly among 200, to obtain a ratio of occurrence of a change in the stop position.

Results of evaluation are indicated in Table 1 below, together with a plurality of values of the width W1. In the table, A represents excellent, B represents good, C represents passing and barely usable, and X represents failing and unusable.

TABLE 1

| Samples | W1 (mm) | Occurrence of failure | Moldability | Total evaluation |
| --- | --- | --- | --- | --- |
| A | 0.4 | 65% | C | X |
| B | 0.6 | 15% | C | X |
| C | 0.7 | 5% | B | C |
| D | 0.8 | 0% | B | B |
| E | 1.0 | 0% | A | A |
| F | 1.2 | 0% | A | A |

Figure 27:
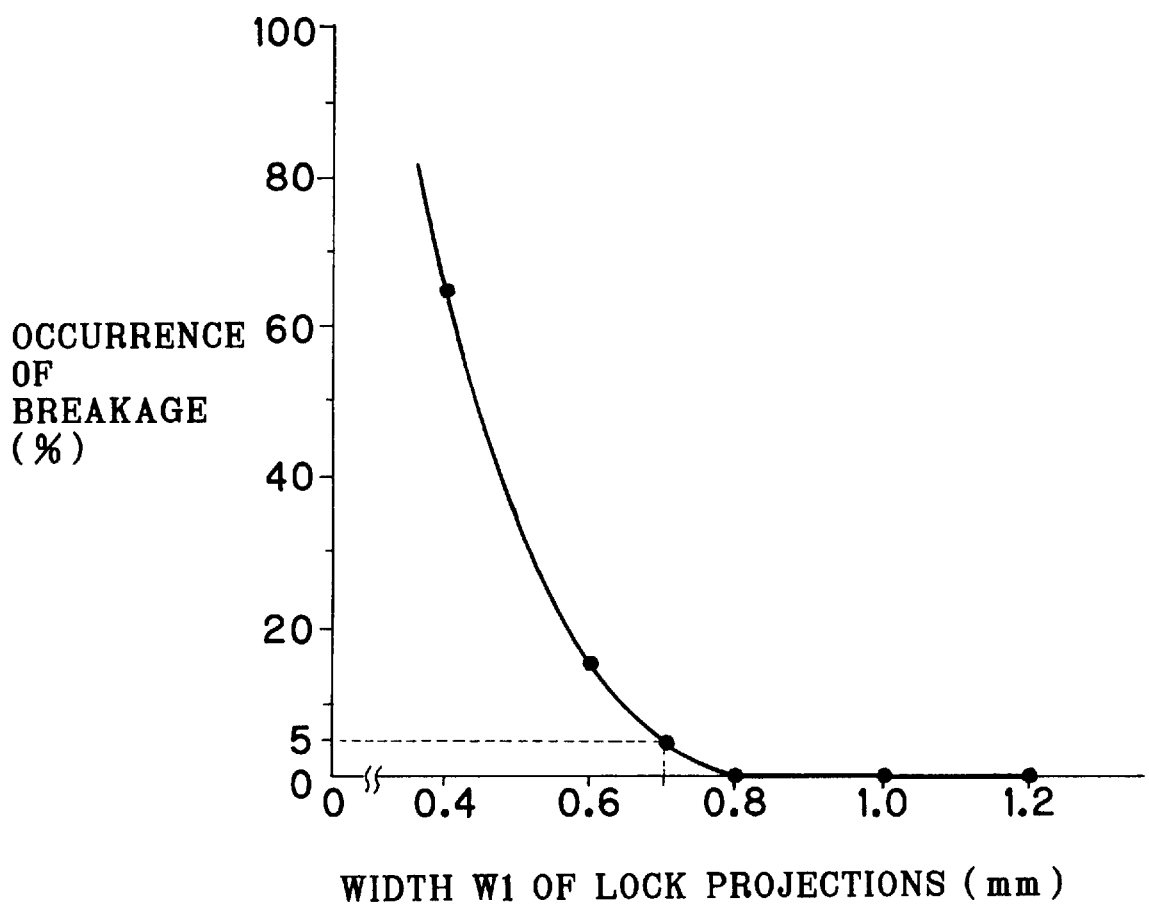
FIG. 27 is a graph illustrating a relationship between a width WI of the lock projections and occurrence of their breakage.

FIG. 27 is a graph indicating a relationship between the width W1 of the lock projections 137 and 138 and occurrence of breakage.

In Table 1, it is observed that there were difficulties in forming the lock projections 137 and 138 integrally with the positioning projection 136 and also the bottom of the case body 131 when the width W1 of the lock projections 137 and 138 was small, and that the moldability was small. The moldability was increased according to an increase of the width W1. When the width W1 of the lock projections 137 and 138 was 1.0 mm or more, the lock projections 137 and 138 were formed with great ease.

In FIG. 27, it is observed that the failure in exactness of positioning the indicator plate 124 was likely to occur according to smallness of the width W1 of the lock projections 137 and 138. When the width W1 of the lock projections 137 and 138 was increased, the failure was decreased. It is estimated that the smallness in the width W1 lowered the retaining force of the spool 115 due to inadequacy in engagement of the lock projections 137 and 138 with the key way 121a of the photo film cassette 110 being contained. When the width W1 of the lock projections 137 and 138 was 0.7 mm or more, occurrence of failure in exactness of positioning the indicator plate 124 was reduced to 5% or less and was in a tolerable range. When the width W1 was 0.8 mm or more, occurrence of failure in exactness of positioning the indicator plate 124 was avoided by stopping the spool 115 from rotating.

Consequently it is concluded that the width W1 of the bottom of the lock projections 137 and 138 is preferably in a range of 0.7–1.0 mm, and desirably in a range of 0.8–1.0 mm.

Furthermore, seven samples G–M of the cassette containing case 130 were experimentally produced in which the thickness t of the lock projections 137 and 138 was changed. Moldability and resistance to impact were tested for each of the samples in the same manner as samples A–F. In samples G–M, the spool retainer portion 135 according to FIG. 19 was formed on the bottom of the case body 131. The width W1 of the bottom of the lock projections 137 and 138 was determined 1.0 mm. Results of evaluation are indicated in Table 2 below, together with a plurality of values of the thickness t.

TABLE 2

| Samples | t (mm) | Occurrence of failure | Moldability | Total evaluation |
| --- | --- | --- | --- | --- |
| G | 0.05 | 45% | X | X |
| H | 0.10 | 5% | C | C |
| I | 0.15 | 0% | B | B |
| J | 0.20 | 0% | A | A |
| K | 0.25 | 0% | A | A |
| L | 0.30 | — | A | X |
| M | 0.50 | — | A | X |

Figure 28:
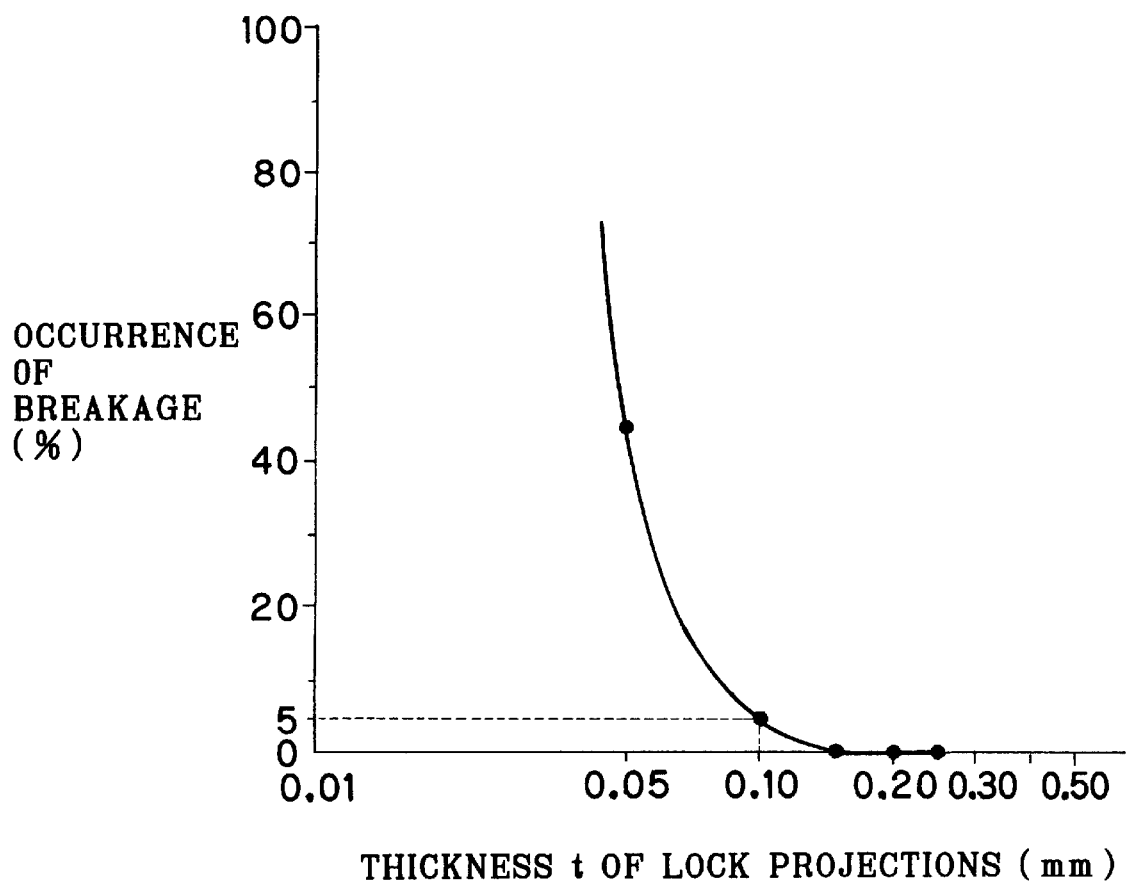
FIG. 28 is a graph illustrating a relationship between thickness t of the lock projections and occurrence of their breakage.

FIG. 28 is a graph indicating a relationship between the thickness t of the lock projections 137 and 138 and occurrence of breakage.

In Table 2, it is observed that there were difficulties in forming the lock projections 137 and 138 integrally with the positioning projection 136 and also the bottom of the case body 131 when the thickness t of the lock projections 137 and 138 was small, and that the moldability was small. The moldability was increased according to an increase of the thickness t. When the thickness t of the lock projections 137 and 138 was 0.20 mm or more, the lock projections 137 and 138 were formed with great ease.

However when the thickness t of the lock projections 137 and 138 was 0.30 mm and 0.50 mm in Samples L and M, the lock projections 137 and 138 were physically rigid and low in flexibility. When confronted with the spool 115 of the photo film cassette 110 on the portion opposite to the key way 121a, a pushed one of the lock projections 137 and 138 was not deformed or collapsed. The photo film cassette 110 was not contained in the cassette containing case 130 and was not usable.

In FIG. 28, it is observed that the failure in exactness of positioning the indicator plate 124 was likely to occur according to smallness of the thickness t of the lock projections 137 and 138. When the thickness t of the lock projections 137 and 138 was increased, the failure was decreased. It is estimated that the smallness in the thickness t lowered retaining force of the spool 115 due to inadequacy in the physical strength or rigidity of the lock projections 137 and 138. When the thickness t of the lock projections 137 and 138 was 0.10 mm or more, occurrence of failure in exactness of positioning the indicator plate 124 was reduced to 5% or less and was in a tolerable range. When the thickness t was 0.15 mm or more, occurrence of failure in exactness of positioning the indicator plate 124 was avoided by stopping the spool 115 from rotating.

It is concluded that the thickness t of the lock projections 137 and 138 is preferably in a range of 0.10–0.20 mm, and desirably in a range of 0.15–0.20 mm.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film cassette including a spool about which photo film is wound in a roll form, and a cassette shell for containing said spool in a rotatable manner, said cassette shell being constituted by first and second shell halves formed respectively from plastic, and joined together via a joining line, said photo film cassette comprising:

a first extended portion, disposed on said first shell half, to project from said joining line toward said second shell half;

a first claw, disposed on an end of said first extended portion, and having a first engaging face oriented to confront with said joining line;

a securing cutout, formed in said second shell half, for receiving said first extended portion;

a second claw, disposed to project from an edge of said securing cutout, for retaining said first claw to secure said first shell half to said second shell half, said second claw having a second engaging face, fitted on said first engaging face, for keeping said second claw engaged with said first claw; and at least one ridge, disposed to project from said second engaging face, extended in a direction of access of said first engaging face, and deformed at least partially by said first engaging face, for tightening a contact between said first and second claws.

2. A photo film cassette as defined in claim 1, wherein said first and second engaging faces and said at least one ridge satisfying a condition of:

$$h1 > H \geq h2$$

where h1 is a height of said ridge with reference to said joining line,

H is a height of said first engaging face with reference to said joining line, and h2 is a height of said second engaging face with reference to said joining line.

3. A photo film cassette as defined in claim 1, comprising:

a photo film passageway, formed between said first and second shell halves to open said cassette shell along a part of said joining line, said photo film being advanced through said passageway to exit from said cassette shell; and first and second retainer mechanisms, disposed on respective sides of said passageway, each of said first and second retainer mechanisms being constituted by said first extended portion, said first and second claws and said securing cutout.

4. A photo film cassette as defined in claim 3, wherein said first shell half is confronted with an emulsion surface of said photo film passing through said passageway, and said second shell half contacts a back surface of said photo film passing through said passageway.

5. A photo film cassette as defined in claim 3, wherein said securing cutout is formed in a channel shape by cutting said second shell half on said joining line.

6. A photo film cassette as defined in claim 5, wherein there is a gap defined between an outer face of said first extended portion and said edge of said securing cutout when said first extended portion is received in said securing cutout;

said securing cutout and said gap satisfy a condition of:

$$[16-(W_1^2/4)]^{1/2} > 4-d$$

where d in millimeters is a depth of said gap with reference to said edge of said securing cutout, and $W_1$ in millimeters is a width of said securing cutout as viewed vertically to said ridge.

7. A photo film cassette as defined in claim 6, further comprising a retracted face formed with an inclination on an outside of said end of said first extended portion, said gap being defined between said retracted face and said edge of said securing cutout.

8. A photo film cassette as defined in claim 3, wherein said first and second engaging faces and said ridge satisfy a condition of:

$$h1-H \leq 0.2 \text{ mm}$$

and $$H-h2 \leq 0.15 \text{ mm}.$$

9. Photo film cassette as defined in claim 1 and further including a cassette containing case for receiving said cassette, an unexposed indicator opening formed in an end face of said cassette shell, a pair of key ways formed respectively in axial ends of said spool to facilitate rotation of said spool in response to external operation, and an indicator plate disposed in one of said axial ends of said spool, said cassette containing case comprising:

a case body, disposed about said photo film cassette, and having a bottom and an open end opposite to said bottom;

a cap, fitted on said open end, for closing said case body; and at least one lock means, disposed to project from an inside of said bottom or said cap, received in one of said key ways when said indicator plate is in said unexposed indicator opening, for preventing said spool from rotating.

10. A cassette containing case as defined in claim 9, wherein said photo film cassette as viewed rotationally has a shape different from a circle, and said case body as viewed in cross section has such a substantially elliptical shape as to keep said photo film cassette from rotating.

11. A cassette containing case as defined in claim 10, wherein said at least one lock means comprises two lock means having a plate shape, being deformable, being arranged radially about a center of said bottom and substantially in a rotationally symmetrical manner with one another, and when one of said lock means is received in said key way, remainder of said lock means is deformed by said one axial end of said spool.

12. A cassette containing case as defined in claim 11, wherein said two lock means are formed integrally with said bottom.

13. A cassette containing case as defined in claim 12, wherein said lock means have a lateral edge being so inclined as to facilitate insertion of said lock means into said key way.

14. A cassette containing case as defined in claim 13, further comprising a positioning projection, disposed to project from said inside of said bottom, and having a shape of a frustum of a cone, said lock means being radially extended from said positioning projection.

15. A photo film cassette including a spool about which photo film is wound in a roll form, and a cassette shell for containing said spool in a rotatable manner, said cassette shell being constituted by first and second shell halves formed respectively from plastic, and joined together via a joining line, said photo film cassette comprising:

a first extended portion, disposed on said first shell half, to project from said joining line toward said second shell half;

a first claw, disposed on an end of said first extended portion, to project inwards with reference to said cassette shell;

a securing cutout, formed in said second shell half, for receiving said first extended portion, there being a gap defined between an outer face of said first extended portion and an edge of said securing cutout when said first extended portion is received in said securing cutout;

a second claw, disposed to project from said edge of said securing cutout and outwards with reference to said cassette shell, for retaining said first claw to secure said first shell half to said second shell half;

wherein said securing cutout and said gap satisfy a condition of:

$$[16-(W_1^2/4)]^{1/2} > 4-d$$

where d in millimeters is a depth of said gap with reference to said edge of said securing cutout, and $W_1$ in millimeters is a width of said securing cutout as viewed vertically to a direction of access of said first extended portion.

16. A photo film cassette as defined in claim 15, wherein said securing cutout is formed in a channel shape by cutting said second shell half on said joining line.

17. A photo film cassette as defined in claim 16, further comprising a retracted face formed with an inclination on an outside of said end of said first extended portion, said gap being defined between said retracted face and said edge of said securing cutout.

18. A photo film cassette as defined in claim 15, wherein said first claw has a first engaging face oriented to confront with said joining line;

said second claw has a second engaging face, fitted on said first engaging face, for keeping said second claw engaged with said first claw;

further comprising at least one ridge, disposed to project from said second engaging face, extended in said direction of access of said first engaging face;

wherein said first and second engaging faces and said ridge satisfy a condition of:

$$h1-H \geq -0.05 \text{ mm}$$

and $$H-h2 \geq -0.05 \text{ mm}$$

where h1 is a height of said ridge with reference to said joining line,

H is a height of said first engaging face with reference to said joining line, and h2 is a height of said second engaging face with reference to said joining line.

* * * * *